(12) United States Patent
Ayabe et al.

(10) Patent No.: US 10,641,730 B2
(45) Date of Patent: May 5, 2020

(54) EQUILIBRIUM POTENTIAL ESTIMATING METHOD, EQUILIBRIUM POTENTIAL ESTIMATING DEVICE, CONCENTRATION ESTIMATING DEVICE, PROGRAM, MEDIUM AND BLOOD SUGAR ESTIMATING DEVICE

(71) Applicant: ASAHI KASEI KABUSHIKI KAISHA, Tokyo (JP)

(72) Inventors: Masaaki Ayabe, Tokyo (JP); Ken Udagawa, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 418 days.

(21) Appl. No.: 15/593,343

(22) Filed: May 12, 2017

(65) Prior Publication Data

US 2017/0248545 A1 Aug. 31, 2017

Related U.S. Application Data

(63) Continuation of application No. PCT/JP2015/081363, filed on Nov. 6, 2015.

(30) Foreign Application Priority Data

Nov. 12, 2014 (JP) ................................. 2014-229614

(51) Int. Cl.
*G01N 27/416* (2006.01)
*G01N 27/327* (2006.01)

(52) U.S. Cl.
CPC ..... *G01N 27/4168* (2013.01); *G01N 27/3272* (2013.01); *G01N 27/3273* (2013.01);
(Continued)

(58) Field of Classification Search
CPC ........... G01N 27/4168; G01N 27/3274; G01N 27/3273; G01N 27/3272; C02F 2209/04; C02F 2201/4614; C02F 2201/46135
See application file for complete search history.

(56) References Cited

U.S. PATENT DOCUMENTS

2008/0105568 A1 5/2008 Wu
2008/0179197 A1 7/2008 Wu
(Continued)

FOREIGN PATENT DOCUMENTS

JP S58-52556 A 3/1983
JP H02-40551 2/1990
(Continued)

OTHER PUBLICATIONS

International Preliminary Report on Patentability for International Application No. PCT/JP2015/081363, issued by the International Bureau of WIPO dated May 26, 2017.
(Continued)

*Primary Examiner* — J. Christopher Ball

(57) ABSTRACT

An oxidation-reduction substance equilibrium potential estimating method is provided, the method including:
applying a voltage to an electrode contacting a sample containing an oxidation-reduction substance and sweeping the voltage;
measuring a current flowing through the electrode;
if an integrated value of the current becomes a value within a reference range, determining whether to sweep the voltage in an opposite direction to a sweep direction in the previous sweeping or to terminate sweeping of the voltage;
if it is determined to terminate sweeping of the voltage, estimating an oxidation-reduction substance equilibrium potential at a value of the voltage; and
(Continued)

if it is determined to sweep the voltage, sweeping the voltage in an opposite direction to a sweep direction in the previous sweeping.

21 Claims, 19 Drawing Sheets

(52) U.S. Cl.
CPC .. *G01N 27/3274* (2013.01); *C02F 2201/4614* (2013.01); *C02F 2201/46135* (2013.01); *C02F 2209/04* (2013.01)

(56) References Cited

U.S. PATENT DOCUMENTS

| | | | |
|---|---|---|---|
| 2010/0000881 A1* | 1/2010 | Franzen | C12Q 1/6825 205/780.5 |
| 2015/0226701 A1 | 8/2015 | Futagawa et al. | |

FOREIGN PATENT DOCUMENTS

| | | | |
|---|---|---|---|
| JP | H06-148138 A | 5/1994 | |
| WO | WO-2014025044 A1 * | 2/2014 | ......... G01N 27/4168 |

OTHER PUBLICATIONS

Supplementary European Search Report for European Patent Application No. 15 85 9251.9, issued by the European Patent Office dated Sep. 28, 2017.

Hayashi K et al:"Mixed solvent electrolyte for high voltage lithium metal secondary cells", Electrochimica A, Elsevier Science Publishers, Barking, GB, vol. 44, No. 14, Mar. 1, 1999 (Mar. 1, 1999), pp. 2337-2344, XP004184738, ISSN:0013-4686, D0I:10.1016/S0013-4686(98)00374-0 *p. 2338, col. 2, paragraph 3-p. 2339, col. 2, paragraph 1;figure 1; table 2*.

European Office Action for European Patent Application No. 15 85 9251.9, issued by the European Patent Office dated Oct. 23, 2017.

Akira Fujishima et al., Denki Kagaku Sokuteiho (Jo), Gihodo Shuppan Co., Ltd., Nov. 15, 1984 (Nov. 15, 1984), 145-148.

Bobacka J, Lewenstam A, Ivaska A, Equilibrium potential of potentiometric ion sensors under stead-state current by using current-reversal chronopotentiometry., J Electroanal Chem, Aug. 10, 2001, vol. 509 No. 1, p. 27-30.

International Search Report for International Patent Application No. PCT/JP2015/081363, issued by the Japan Patent Office dated Jan. 19, 2016.

* cited by examiner

EQUILIBRIUM POTENTIAL ESTIMATING METHOD, EQUILIBRIUM POTENTIAL ESTIMATING DEVICE, CONCENTRATION ESTIMATING DEVICE, PROGRAM, MEDIUM AND BLOOD SUGAR ESTIMATING DEVICE

The contents of the following Japanese patent application(s) are incorporated herein by reference:
NO. 2014-229614 filed in JP on Nov. 12, 2014, and
NO. PCT/JP2015/081363 filed on Nov. 6, 2015

BACKGROUND

1. Technical Field

The present invention relates to an equilibrium potential estimating method, an equilibrium potential estimating device, a concentration estimating device, a program, a medium and a blood sugar estimating device.

2. Related Art

Conventionally, as a concentration estimating device that estimates the concentration of an oxidation-reduction substance, a device that measures a current value that flows if a constant voltage is applied to a solution has been known. Conventional concentration estimating devices estimate the concentration of an oxidation-reduction substance based on changes in measured current values (please see, for example, Patent Documents 1 and 2).

Patent Document 1: Japanese Patent Application Publication No. 2011-174943
Patent Document 2: Japanese Patent Application Publication No. 2013-217933

However, conventional concentration estimating devices cannot estimate a precise concentration because measured current values change corresponding not only to the concentration of an oxidation-reduction substance but also to the area of an electrode or the diffusion coefficient of a solution. Also, as a solution to these issues, a method of measuring an open circuit voltage of a solution and estimating its concentration has been known, but simply contact between the solution and an electrode causes an oxidation-reduction reaction, so the potential corresponding to the concentration of the solution cannot be estimated precisely.

SUMMARY

A first aspect of the present invention provides an oxidation-reduction substance equilibrium potential estimating method, including:
applying a voltage to an electrode contacting a sample containing an oxidation-reduction substance and sweeping the voltage;
measuring a current flowing through the electrode;
if an integrated value of the current becomes a value within a reference range, determining whether to sweep the voltage in an opposite direction to a sweep direction in the previous sweeping or to terminate sweeping of the voltage;
if it is determined to terminate sweeping of the voltage, estimating an oxidation-reduction substance equilibrium potential at a value of the voltage; and
if it is determined to sweep the voltage, sweeping the voltage in an opposite direction to a sweep direction in the previous sweeping.

A second aspect of the present invention provides an oxidation-reduction substance equilibrium potential estimating device including:
a voltage applying unit that applies a voltage to an electrode contacting a sample containing an oxidation-reduction substance;
a current measuring unit that measures a current flowing through the electrode; and
a signal processing unit that instructs the voltage applying unit to sweep the voltage and, if an integrated value of the current becomes a value within a reference range, determines whether to sweep the voltage in an opposite direction to a sweep direction in the previous sweeping or to terminate sweeping of the voltage, wherein
the signal processing unit instructs the voltage applying unit to: estimate an oxidation-reduction substance equilibrium potential at a value of the voltage if it is determined to terminate sweeping of the voltage; and sweep the voltage in an opposite direction to a previous sweep direction if it is determined to sweep the voltage.

A third aspect of the present invention provides an oxidation-reduction substance concentration estimating device including:
the oxidation-reduction substance equilibrium potential estimating device according to the second aspect; and
an estimating unit that estimates a concentration of the oxidation-reduction substance based on a voltage value.

A fourth aspect of the present invention provides a program that causes a computer to function as the signal processing unit in the oxidation-reduction substance equilibrium potential estimating device according to the second aspect.

A fifth aspect of the present invention provides a computer-readable medium having stored thereon the program according to the fourth aspect.

A sixth aspect of the present invention provides a blood sugar estimating device including the oxidation-reduction substance concentration estimating device according to the third aspect and an electrode.

The summary clause does not necessarily describe all necessary features of the embodiments of the present invention. The present invention may also be a sub-combination of the features described above.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
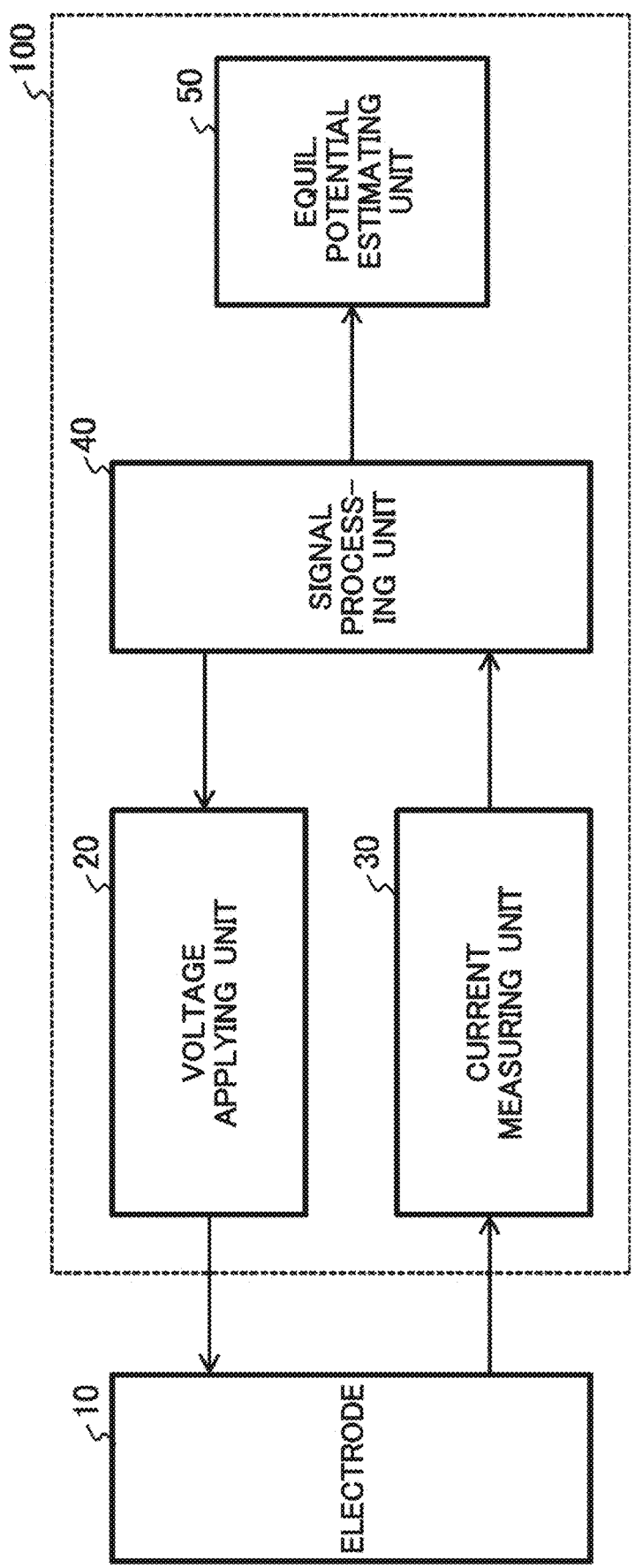
FIG. 1 shows an exemplary configuration of an equilibrium potential estimating device 100.

FIG. 1 shows an exemplary configuration of an equilibrium potential estimating device 100. The equilibrium potential estimating device 100 includes a voltage applying unit 20, a current measuring unit 30, a signal processing unit 40 and an equilibrium potential estimating unit 50. The equilibrium potential estimating device 100 is connected with an electrode 10 contacting a sample (solution) containing an oxidation-reduction substance, and estimates an equilibrium potential of the solution. In the present specification, if a sample is simply referred to as a solution, it refers to a solution to be a target whose equilibrium potential is to be estimated.

The electrode 10 undergoes an oxidation-reduction reaction with an oxidation-reduction substance contained in the solution, and exchanges electrons with it. The exchange of electrons occurs on a surface of the electrode 10. The oxidation-reduction substance is, for example, an oxidation-type mediator and a reduction-type mediator. A mediator that has released electrons becomes an oxidation-type mediator, and a mediator that has received electrons becomes a reduction-type mediator.

The voltage applying unit 20 applies a voltage to the electrode 10. For example, the application of the voltage to the electrode 10 is performed together with another electrode which is called a reference electrode to which a reference voltage is applied. The voltage applying unit 20 may sweep the voltage applied to the electrode 10. The sweeping refers to changing the voltage applied to the electrode 10 over time. The sweeping includes not only increasing and decreasing the voltage linearly at a constant rate but also changing the voltage at any change rate. Also, the sweeping may include changing the voltage non-linearly and changing the voltage stepwise so that it becomes consecutive discrete values.

The current measuring unit 30 measures a current flowing through the electrode 10. The current measuring unit 30 transmits the measured current value to the signal processing unit 40.

The signal processing unit 40 calculates a current integrated value of currents measured by the current measuring unit 30. For example, the current integrated value is the total of currents that have flown since the voltage applying unit 20 applied a voltage to the electrode 10 until signal processing is performed. For example, if in a measurement period, the sum of currents in a direction to flow from the electrode 10 into a solution is equal to the sum of currents in a direction to flow out from the solution to the electrode 10, the current integrated value is 0. The signal processing unit 40 determines a condition of a voltage that the voltage applying unit 20 applies to the electrode 10 next if the current integrated value becomes a value within a reference range. The reference range mentioned here may be changed to any range corresponding to a solution used. The reference range may be a range from a predetermined value to a positive tolerance, a negative tolerance or positive and negative tolerances. Also, the signal processing unit 40 judges whether or not a voltage that the voltage applying unit 20 applied to the electrode 10 has converged if the current integrated value becomes a value within the reference range. If it is judged that it has converged as a result of this judgement, the sweeping is terminated. Other than judging whether or not a voltage has converged, this judgement of termination may be conditioned on judgement by the signal processing unit 40 whether or not a change amount between currents corresponding to a sweep width of the voltage is within a tolerated range. The judgement of whether or not a change amount between currents is within a tolerated range is judgement of: whether or not the absolute value of a current value or the $\alpha$-th power ($\alpha$ is a real number larger than 0. The same applies hereinafter.) of the current value observed corresponding to a voltage sweep width is within a certain range; whether or not the absolute value of the current value or the $\beta$-th power ($\beta$ is a real number smaller than 0. The same applies hereinafter.) of the current value is outside a certain range; or whether or not a change amount between observed currents per sweeping is within a certain range. That is, the judgement mentioned here is, after all, to judge whether a current falls within a tolerated range. In the present specification, being within a reference range may include a value being a value of a reference if the width of a reference range is zero.

Also, the signal processing unit 40 may judge whether or not a change amount between integrated values of currents corresponding to a voltage sweep width is within a tolerated range. The judgement of whether or not a change amount between integrated values is within a tolerated range is judgement of: whether or not the absolute value of an integrated value or an $\alpha$-th power of the integrated value of currents observed corresponding to a voltage sweep width is within a certain range; whether or not the absolute value of the integrated value or $\beta$-th power of the integrated value is outside a certain range; or whether or not a change amount between the integrated values per sweeping is within a certain range. That is, the judgement mentioned here is, after all, to judge whether an integrated value falls within a tolerated range. Furthermore, this judgement of termination may be conditioned on the number of times of sweeping or the measurement time such as whether or not the number of times of implementation of sweeping has reached a certain number of times or whether or not the time elapsed after a measurement start time has reached certain time. For example, the signal processing unit 40 determines to sweep a voltage in an opposite direction to a sweep direction in previous sweeping if the number of times of sweeping is less than N (N is a natural number. The same applies hereinafter.), and determines to terminate sweeping of a voltage if the number of times of sweeping is N.

The equilibrium potential estimating unit 50 estimates an equilibrium potential of a solution from a signal processing result of the signal processing unit 40. The equilibrium potential estimating unit 50 may output, to a user, the estimated equilibrium potential as is. Also, the equilibrium potential estimating unit 50 may calculate the concentration of an oxidation-type mediator or a reduction-type mediator from the estimated equilibrium potential.

Figure 2:
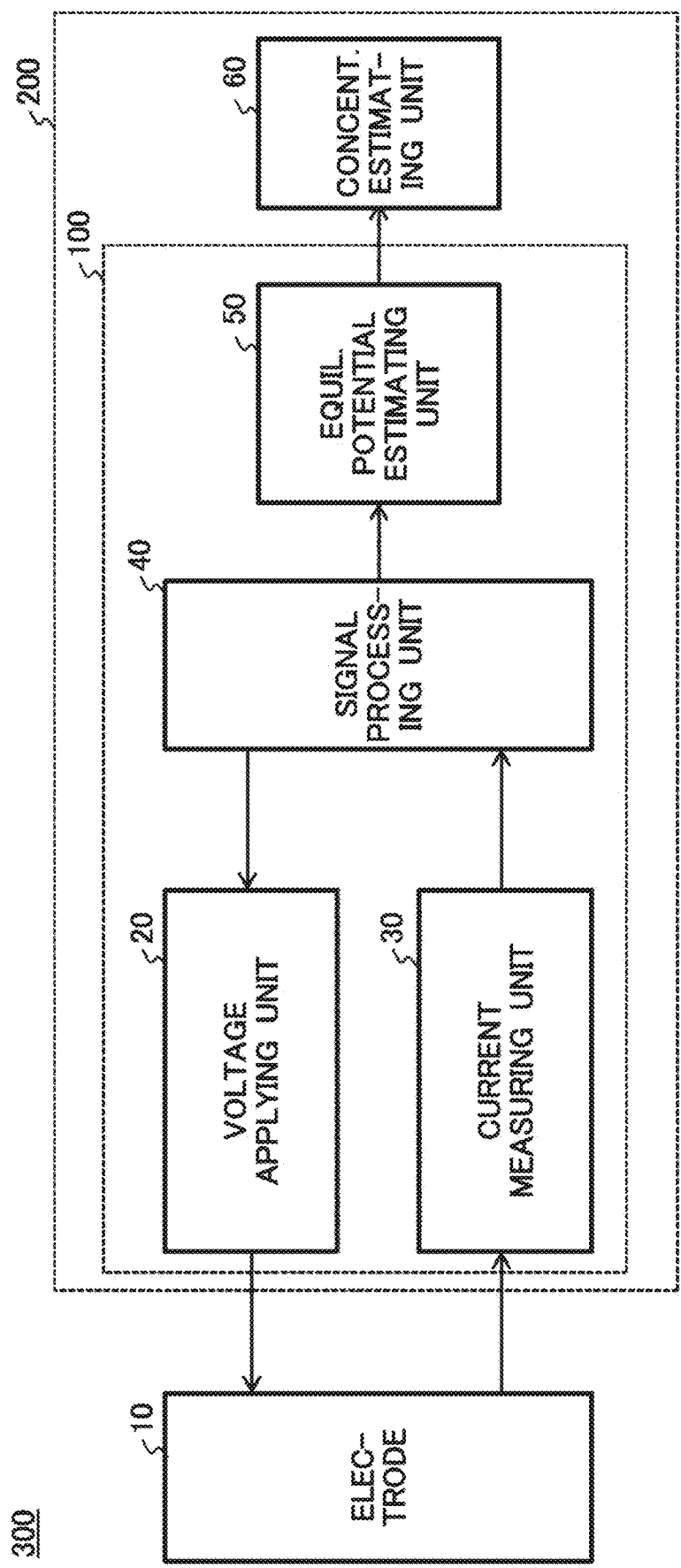
FIG. 2 shows an exemplary configuration of a blood sugar estimating device 300.

FIG. 2 shows an exemplary configuration of a blood sugar estimating device 300. The blood sugar estimating device 300 includes the electrode 10 and a concentration estimating device 200 connected to the electrode 10.

The blood sugar estimating device 300 estimates a blood sugar level which is the concentration of glucose (dextrose) in blood. The blood sugar estimating device 300 is one example of devices that estimate the concentration of an oxidation-reduction substance from a reaction amount of an oxidation-reduction reaction that the oxidation-reduction substance undergoes with the electrode 10. In other words, estimation targets are not limited to blood sugar levels, but the blood sugar estimating device 300 can similarly estimate the concentration of another solution by changing enzyme or the like that reacts to solutions. A device having the same configuration as that of the blood sugar estimating device 300 can be used for: measurement of amounts of biological materials such as protein, amino acid or lipid; environmental measurement about PH, hazardous materials or the like; food evaluation; or the like.

The concentration estimating device 200 includes the equilibrium potential estimating device 100 and a concentration estimating unit 60. The concentration estimating unit 60 estimates the concentration of a solution based on an equilibrium potential estimated by the equilibrium potential estimating device 100. The concentration of a solution may be the concentration of an oxidation-type mediator or a reduction-type mediator in the solution. The concentration of a solution can be calculated from an equilibrium potential using the Nernst equation. The Nernst equation is expressed as:

$$E = E_0 + \frac{RT}{nF} \ln\left(\frac{C_{ox}}{C_{red}}\right) \quad \text{[Equation 1]}$$

where E is an equilibrium potential, $E_0$ is a standard electrode potential, R is a gas constant, T is a temperature (K), n is the number of mobile electrons, F is the Faraday constant, $C_{ox}$ is the concentration of an oxidation-type mediator, and $C_{Red}$ is the concentration of a reduction-type mediator.

Figure 3:
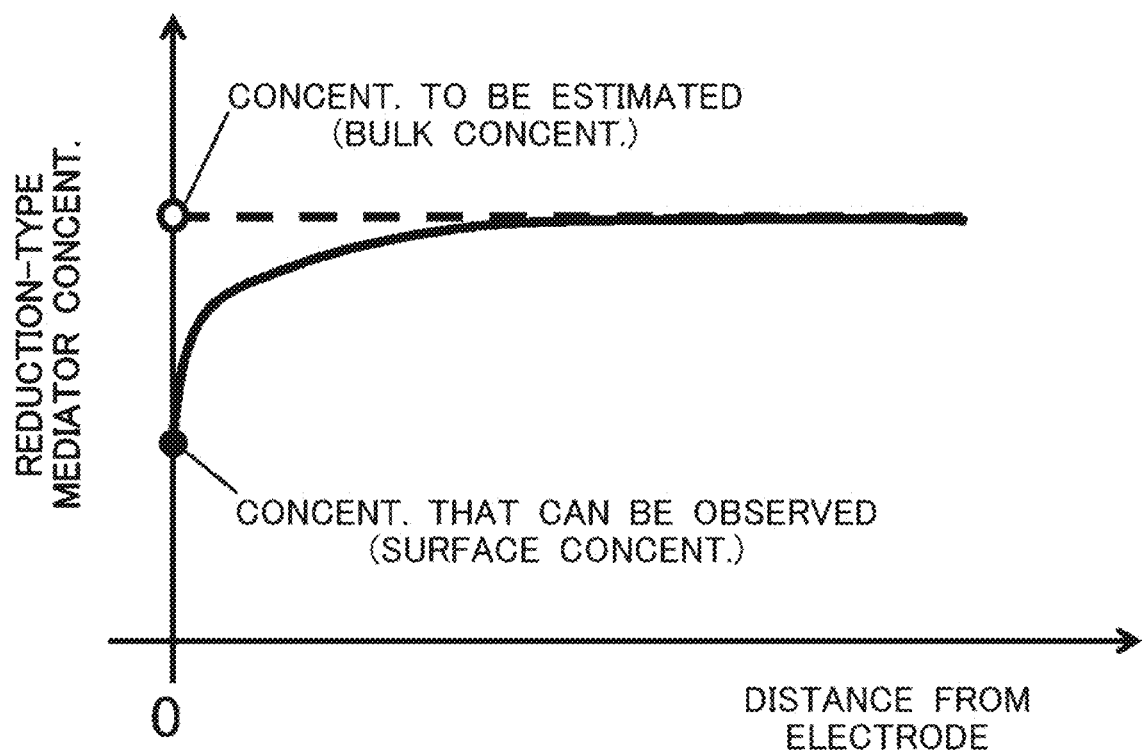
FIG. 3 shows a reduction-type mediator concentration gradient.

FIG. 3 shows a reduction-type mediator concentration gradient in a solution. A concentration gradient is the slope of a concentration in relation to a distance from the electrode 10. The vertical axis indicates reduction-type mediator concentration, and the horizontal axis indicates a distance from a surface of the electrode 10. In the present specification, a concentration on the surface of the electrode 10 is called a surface concentration, and a concentration at a position distant from the surface of the electrode 10 is called a bulk concentration. The position distant from the surface of the electrode 10 is a position at which the concentration of the solution becomes constant.

The dotted line indicates an ideal reduction-type mediator concentration gradient of a solution. In an ideal state, at the time of measurement, the reduction-type mediator concentration gradient of a solution becomes constant regardless of a distance from the electrode 10. On the other hand, the solid line indicates an actual concentration gradient observed if the electrode 10 contacts a solution. In an actual state, an oxidation-reduction reaction occurs due to a difference in electrochemical potentials between the electrode 10 and a solution. Thereby, the actual reduction-type mediator concentration gradient is different from the ideal concentration gradient of the reduction-type mediator.

Here, because an equilibrium potential estimated by the equilibrium potential estimating device 100 is based on a reaction at an interface between the electrode 10 and the solution, a concentration that the equilibrium potential estimating device 100 can actually estimate is limited to a surface concentration of the solution. Accordingly, in order to estimate the concentration of a solution more precisely, it is necessary to make the surface concentration of the solution the same with the bulk concentration of the solution.

Figure 4:
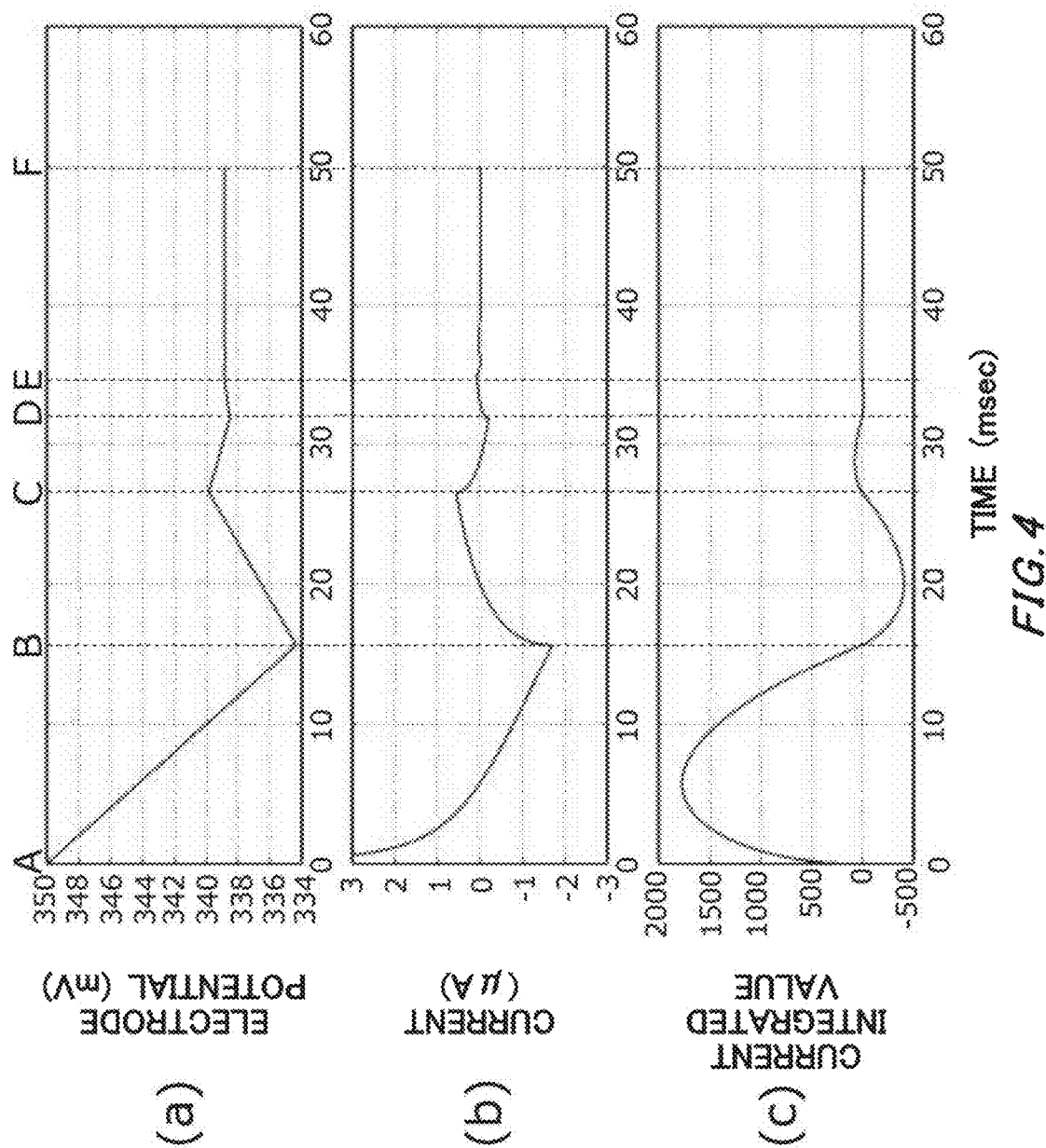
FIG. 4 shows an exemplary method of estimating an equilibrium potential.

FIG. 4 shows an exemplary method of estimating an equilibrium potential. (a) of FIG. 4 shows temporal changes in voltages that the voltage applying unit 20 applies to the electrode 10. (b) of FIG. 4 shows temporal changes in currents measured by the current measuring unit 30. (c) of FIG. 4 shows temporal changes in current integrated values calculated by the signal processing unit 40.

In the period A-B, the voltage applying unit 20 sweeps a voltage in a direction of reduction from an initial voltage at a certain rate. The time A is time at which the voltage applying unit 20 applies an initial voltage to the electrode 10. Using the equilibrium potential estimating method in the present example, an equilibrium potential can be estimated even if the initial voltage is any value. However, setting the initial voltage around an equilibrium potential that is predicted from the properties of a solution shortens the time required for estimation.

In the period A-B, the current measuring unit 30 detects a positive current and then detects a negative current. A positive current refers to a current in a direction to flow from the electrode 10 into the solution, and a negative current refers to a current that flows in the opposite direction to that of the positive current. If the current measuring unit 30 measures a positive current, an oxidation reaction is occurring on the surface of the electrode 10, and if the current measuring unit 30 measures a negative current, a reduction reaction is occurring on the surface of the electrode 10. In the period A-B, the current integrated values show an arch-shaped curve because currents switch from positive currents to negative currents. The time B is a time at which the current integrated value calculated by the signal processing unit 40 becomes 0. The time at which the current integrated value becomes 0 is a turning point of an applied voltage sweep speed. In the present specification, a period from a sweep speed turning point to the next turning point is called one cycle.

In the period B-C, the voltage applying unit 20 applies a voltage to the electrode 10 in the opposite direction to the sweep direction in the period A-B. In other words, the applied voltage turns, from a value smaller than the equilibrium potential of a solution, into a larger value. The sweep speed in the period B-C of the present example is controlled to be a half of the sweep speed in the period A-B. Currents measured by the current measuring unit 30 turn, from negative values, into positive values. The point C is a time at which the current integrated value calculated by the signal processing unit 40 becomes 0 again.

In the period C-D and the period D-E, cycles similar to those in the period A-B and the period B-C are repeated, respectively. Thereby, at the time F, the voltage applied by the voltage applying unit 20 converges. The equilibrium potential of the solution is estimated at the converged applied voltage. The cycles of the present example are repeated until the applied voltage converges and the equilibrium potential is estimated. In other examples, the cycles may be repeated until predetermined measurement time elapses.

Because in the equilibrium potential estimating method of the present example, sweeping of an applied voltage is controlled such that the current integrated value becomes 0, the total amount of electrons contained in a solution is kept the same as the initial state. That is, non-destructive measurement without largely changing the properties of the solution from its initial state is possible. Because non-destructive measurement is possible, a solution used in the equilibrium potential estimating method of the present example can be re-used for estimation of an equilibrium potential.

Figure 5:
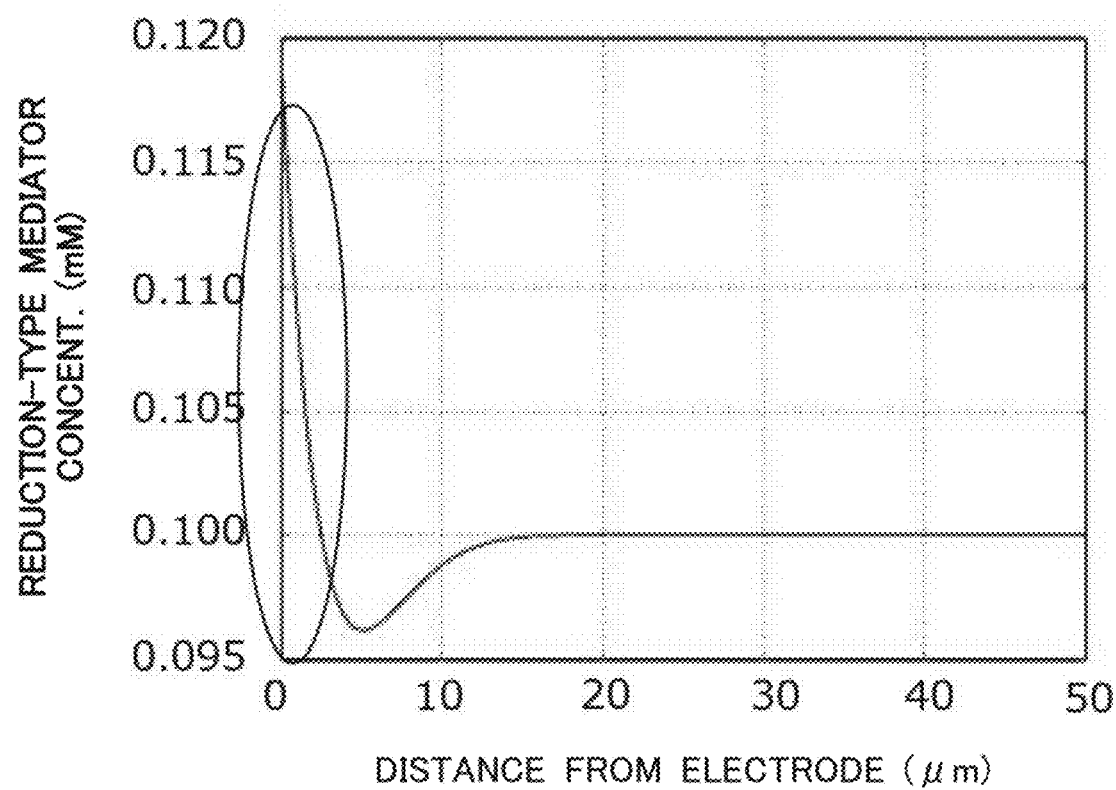
FIG. 5 shows a reduction-type mediator concentration gradient at the time B in FIG. 4.

FIG. 5 shows a concentration gradient of the reduction-type mediator at the time B in FIG. 4. The vertical axis indicates reduction-type mediator concentration, and the horizontal axis indicates a distance from the electrode 10. At the time B, the concentration ratio on the surface of the electrode 10 is a ratio corresponding to a voltage being applied to the electrode 10. Because the voltage being applied to the electrode 10 at the time B is lower than the equilibrium potential of the bulk concentration, the surface concentration of the reduction-type mediator is higher than the bulk concentration.

Figure 6:
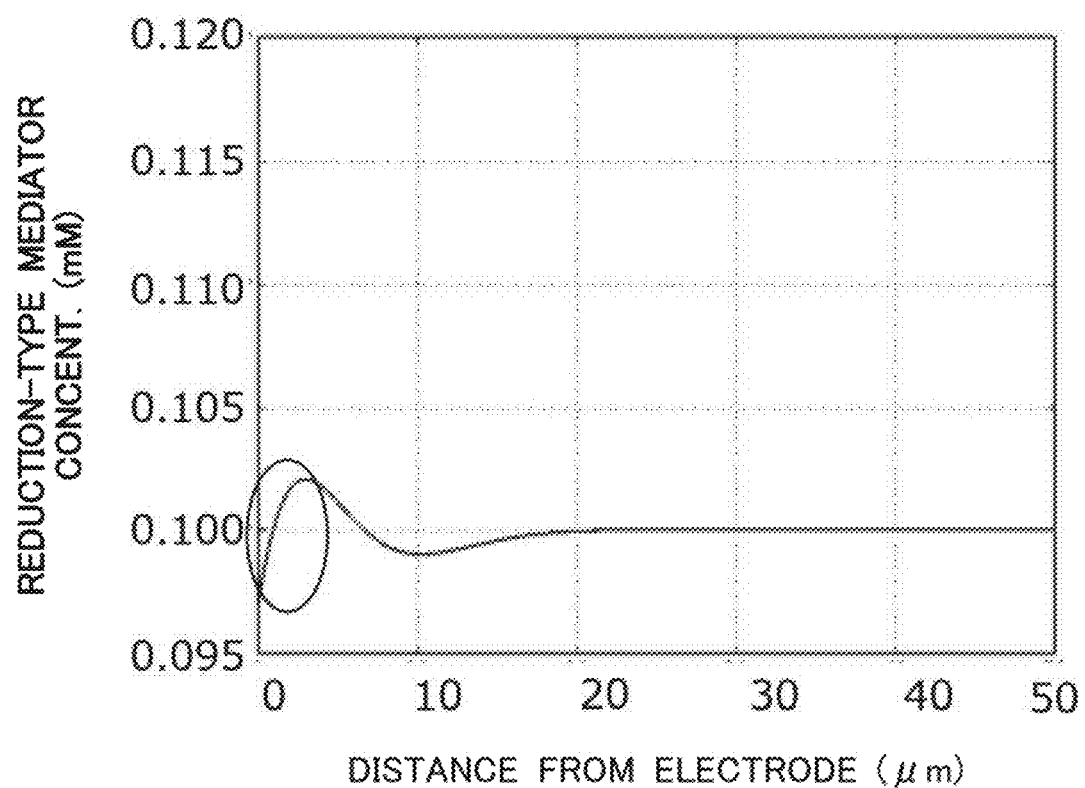
FIG. 6 shows a reduction-type mediator concentration gradient at the time C in FIG. 4.

FIG. 6 shows a concentration gradient of the reduction-type mediator at the time C in FIG. 4. At the time C, the difference between the voltage that the voltage applying unit 20 applies to the electrode 10 and the equilibrium potential is smaller than that at the time B. Also, at the time C, the concentration gradient of the reduction-type mediator around the electrode 10 is smaller than that at the time B.

Figure 7:
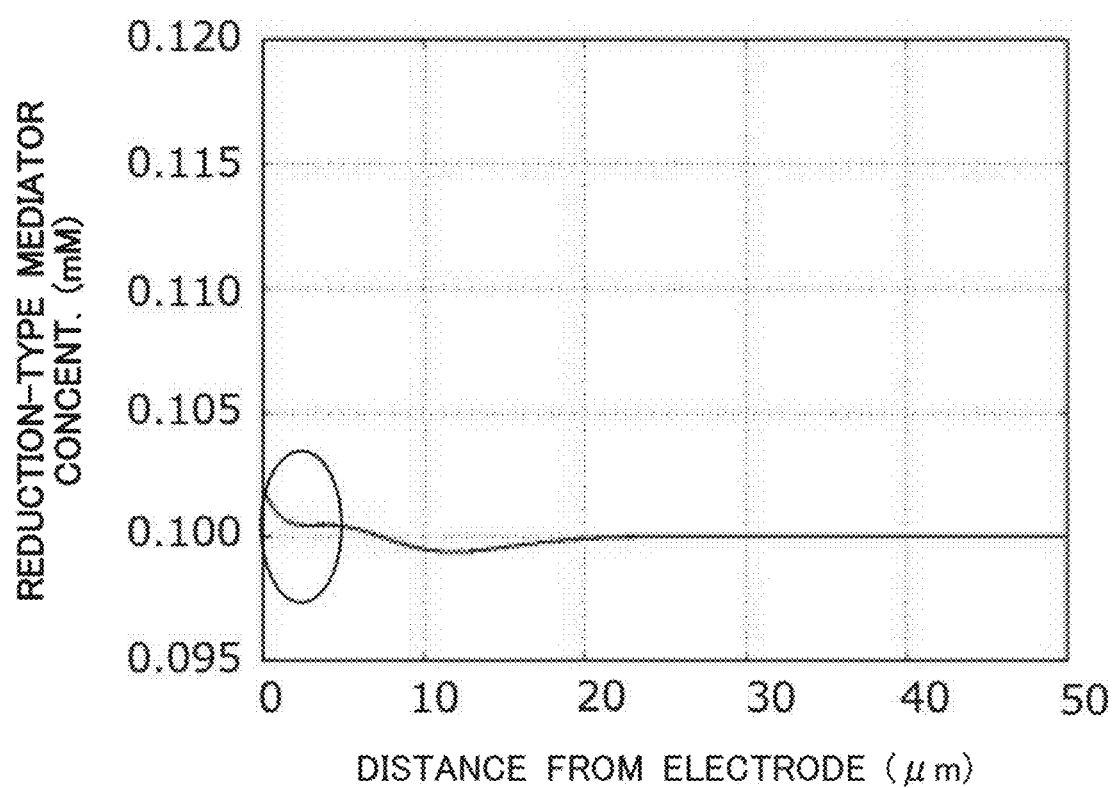
FIG. 7 shows a reduction-type mediator concentration gradient at the time D in FIG. 4.

FIG. 7 shows a concentration gradient of the reduction-type mediator at the time D in FIG. 4. At the time D, the difference between the voltage that the voltage applying unit 20 applies to the electrode 10 and the equilibrium potential is smaller than that at the time C. At the time D, the concentration gradient of the reduction-type mediator around the electrode 10 is smaller than that at the time C.

Figure 8:
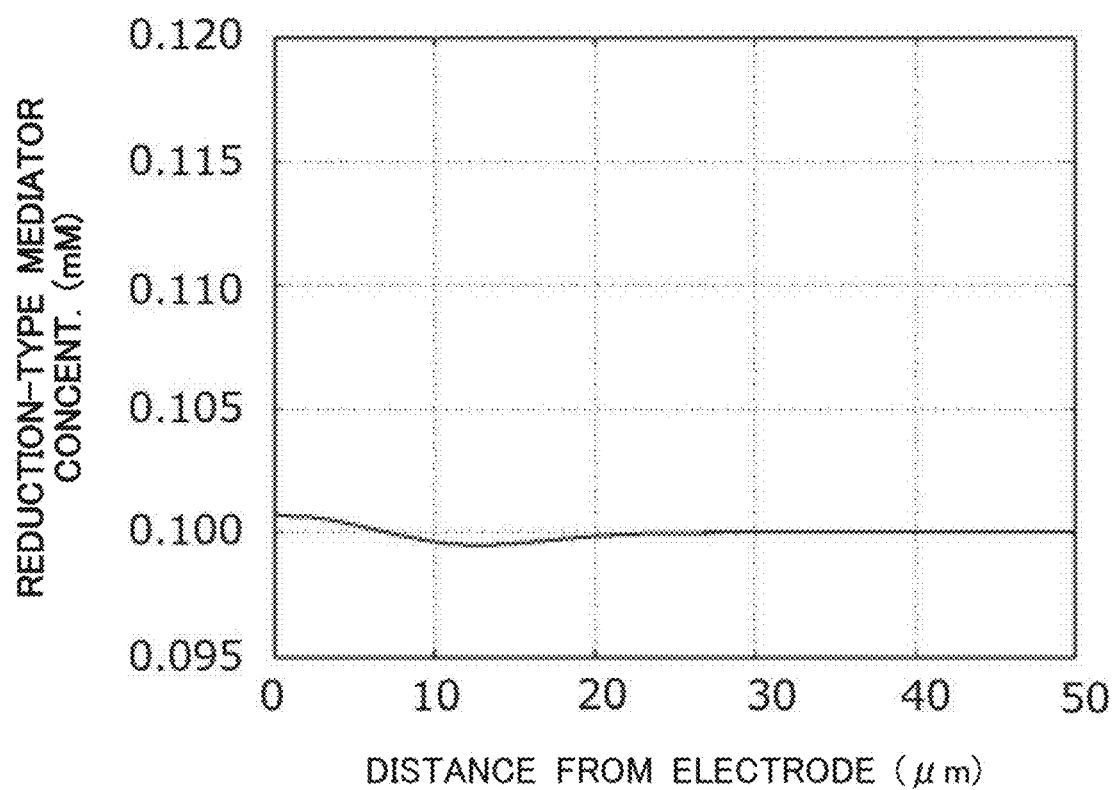
FIG. 8 shows a reduction-type mediator concentration gradient at the time E in FIG. 4.

FIG. 8 shows a concentration gradient of the reduction-type mediator at the time E in FIG. 4. At the time E, the difference between the voltage that the voltage applying unit 20 applies to the electrode 10 and the equilibrium potential is smaller than that at the time D. At the time E, the concentration gradient of the reduction-type mediator around the electrode 10 is smaller than that at the time D.

Figure 9:
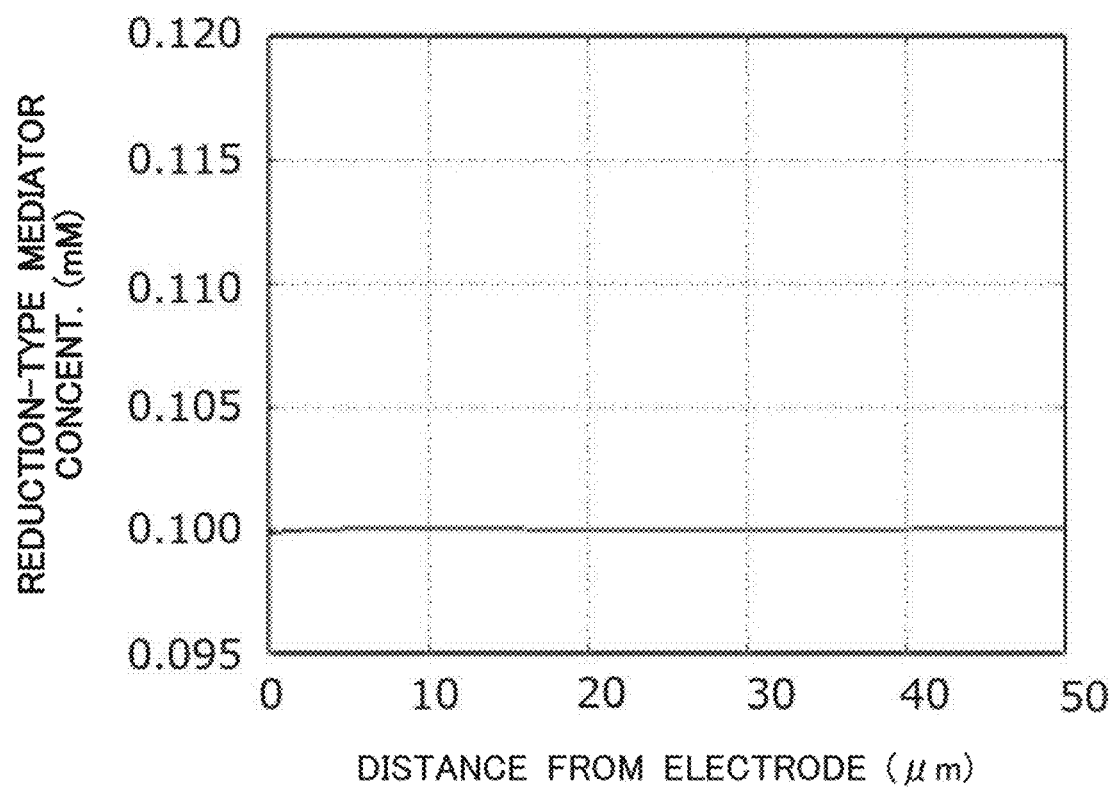
FIG. 9 shows a reduction-type mediator concentration gradient at the time F in FIG. 4.

FIG. 9 shows a concentration gradient of the reduction-type mediator at the time F in FIG. 4. At the time F, the surface concentration of the reduction-type mediator is equal to the bulk concentration of the reduction-type mediator. In other words, a constant reduction-type mediator concentration is obtained regardless of the distance from the electrode 10.

In this manner, the equilibrium potential estimating device 100 according to the present embodiment controls a voltage applied to the electrode 10, so there is no influence of the concentration gradient of a solution. Thereby, the equilibrium potential estimating device 100 can estimate the equilibrium potential of a solution precisely.

Figure 10:
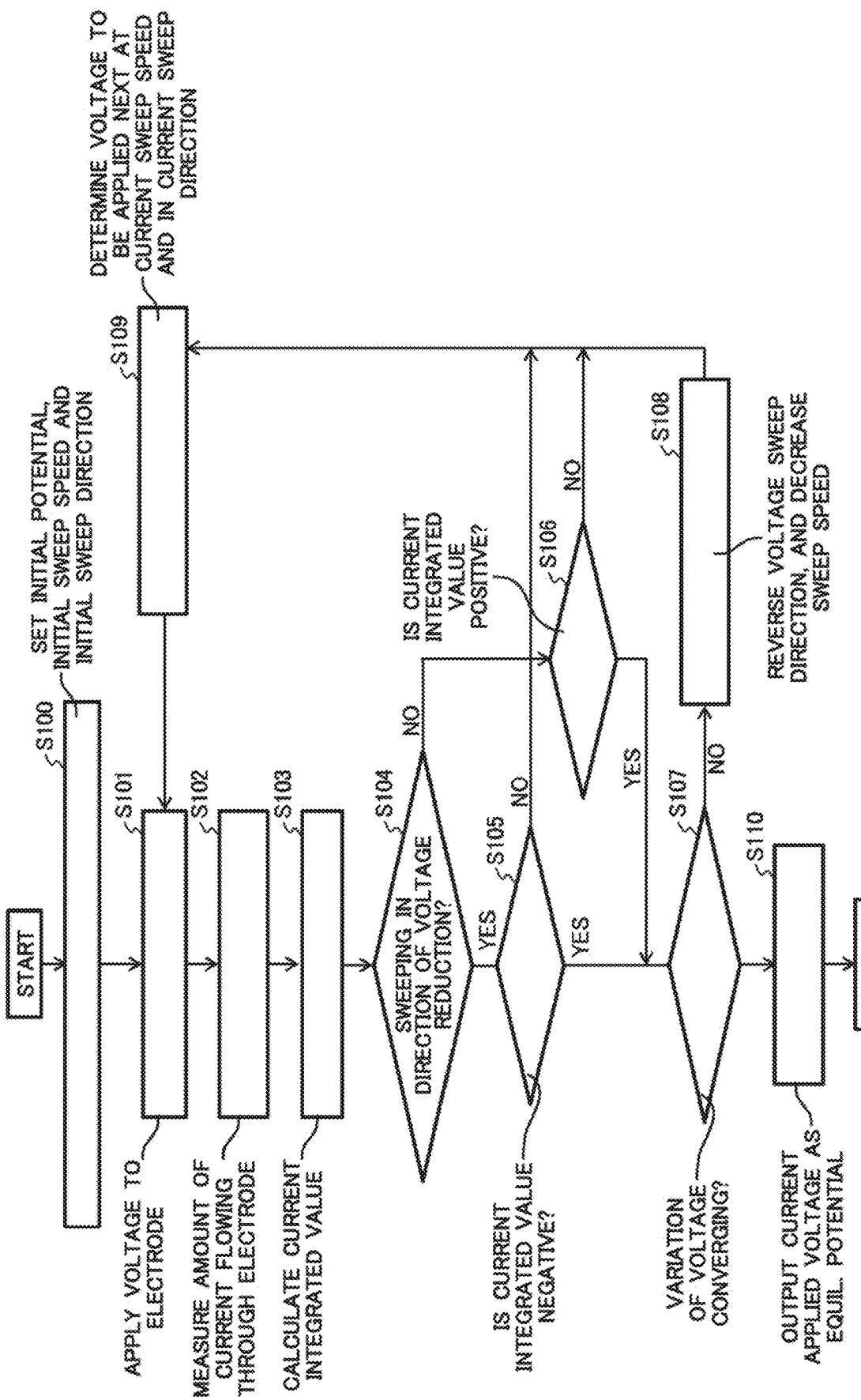
FIG. 10 shows an exemplary flowchart according to an equilibrium potential estimating method.

FIG. 10 shows an exemplary flowchart according to an equilibrium potential estimating method. The equilibrium potential estimating device 100 estimates an equilibrium potential by executing Step S100 to Step S110.

At Step S100, the signal processing unit 40 sets an initial voltage, an initial sweep speed and an initial sweep direction. If the equilibrium potential estimating method according to the present embodiment is used, an equilibrium potential can be estimated by setting the initial voltage, the initial sweep speed and the initial sweep direction to any values and direction. However, by setting the initial voltage, the initial sweep speed and the initial sweep direction to more appropriate values, the time necessary for estimation of an equilibrium potential can be shortened.

At Step S101, the voltage applying unit 20 applies a voltage to the electrode 10. At Step S102, the current measuring unit 30 measures a current flowing through the electrode 10.

At Step S103, the signal processing unit 40 calculates a current integrated value. At Step S104, the signal processing unit 40 judges whether or not the voltage applying unit 20 is sweeping an applied voltage in a direction of reduction. If the applied voltage is being swept in a direction of reduction, the procedure proceeds to Step S105, and if the applied voltage is being swept in a direction of increase, the procedure proceeds to Step S106.

At Step S105, the signal processing unit 40 judges whether or not the current integrated value is negative. If the current integrated value is negative, the procedure proceeds to Step S107, and if the current integrated value is positive, the procedure proceeds to Step S109. On the other hand, at Step S106, the signal processing unit 40 judges whether or not the current integrated value is positive. If the current integrated value is positive, the procedure proceeds to Step S107, and if the current integrated value is negative, the procedure proceeds to Step S109.

At Step S107, the signal processing unit 40 judges whether or not variation of the applied voltage is converging. Whether or not variation of the applied voltage is being converging is determined based on whether or not a sweep width of a predetermined voltage is within a tolerated range. If it is judged that the applied voltage is converging, the procedure proceeds to Step S110, and if it is judged that the applied voltage is not converging, the procedure proceeds to Step S108.

At Step S108, the signal processing unit 40 reverses the voltage sweep direction. Also, the signal processing unit 40 may decrease the sweep speed at Step S108. Because the voltage converges to the equilibrium potential as the number of cycles increases, the time per cycle becomes shorter. To cope with this, differences in lengths of time between respective cycles can be made small by decreasing the sweep speed. For example, the signal processing unit 40 decreases the sweep speed at a predetermined sweep speed decreasing rate every time it executes Step S108. In this case, the sweep speed is decreased at a power of the decreasing rate. Also, the signal processing unit 40 may control the sweep speed such that lengths of time of respective cycles are constant. In this manner, because the signal processing unit 40 changes the voltage sweep speed every time equilibrium potential estimation is performed, it becomes easier for a voltage to converge to the equilibrium potential than in the case where the sweep speed is constant. After Step S108 is executed, the procedure proceeds to Step S109.

At Step S109, a voltage to be applied next at the current sweep speed and in the current sweep direction is determined. The current sweep speed and current sweep direction refer to a sweep speed and a sweep direction set at Step S108 if Step S108 is executed. The signal processing unit 40 determines a voltage to be applied to the electrode 10 next, and the procedure proceeds to Step S101.

At Step S110, the equilibrium potential estimating unit 50 estimates the equilibrium potential at a voltage that the voltage applying unit 20 is applying. The equilibrium potential estimating device 100 may output the estimate equilibrium potential to the outside. If the Step S110 is executed, the equilibrium potential estimation is terminated.

The equilibrium potential estimating device 100 repeats Step S101 to Step S109 until the applied voltage converges at Step S107. The equilibrium potential estimating method of the present example determines whether or not to reverse the sweep direction at Step S108 based on an applied voltage sweep direction judged at Step S104 and whether it is judged at Step S105 and Step S106 that a current integrated value is positive or negative. Thereby, even if the applied voltage is swept in a direction to be more different from the equilibrium potential, the sweep direction can be controlled to be in a direction to be closer to the equilibrium potential.

Figure 11:
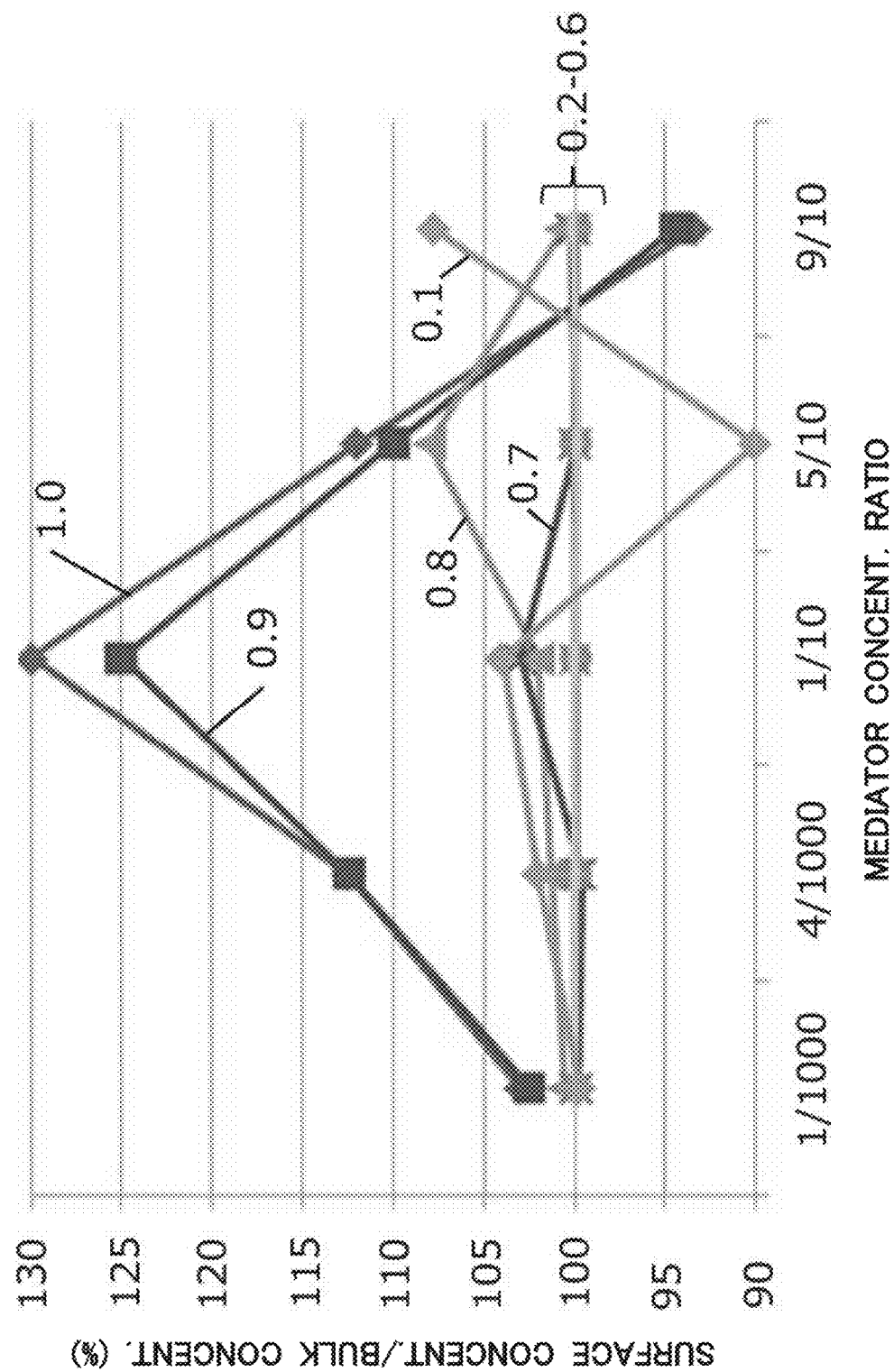
FIG. 11 shows the dependence of a concentration gradient of a solution on sweep speed decreasing rates.

FIG. 11 shows the dependence of a concentration gradient of a solution on sweep speed decreasing rates. The vertical axis indicates the ratio (%) of surface concentration to bulk concentration of a solution, and the horizontal axis indicates the mediator concentration ratio. Also, each curve indicates a result of simulation where the sweep speed decreasing rate is changed from 0.1 to 1.0. The sweep speed at the time of the start of measurement is 1.0 V/sec. The mediator concentration ratio is a ratio of a reduction-type mediator to the sum of an oxidation-type mediator and the reduction-type mediator. The mediator concentration ratio is measured after it has become stabilized in its equilibrium state.

If the ratio of a surface concentration to a bulk concentration is 100(%), this indicates that the surface concentration of the solution has become equal to the bulk concentration. In the present example, if the sweep speed decreasing rate is 0.2 to 0.6, the ratios of the surface concentration to the bulk concentration indicate values close to 100(%) in terms of both the mediator concentration ratios.

The sweep speed decreasing rate is determined based on measurement time, a mediator concentration gradient, voltage sweeping cycle time or the like. For example, the sweep speed decreasing rate is set to a value with which estimation can be terminated within tolerable measurement time. Also, the sweep speed decreasing rate may be determined such that a distance from the surface of the electrode 10 that affects a solution is kept constant within one cycle of voltage sweeping. Affecting a solution means that the concentration of the solution changes due to a reaction between the electrode 10 and the solution. The distance from the surface of the electrode 10 that affects the solution is determined by the length of time per cycle, a diffusion coefficient of a solution or the like. In other words, basically, as the time per cycle increases, the distance that the influence of the electrode 10 can reach increases.

Figure 12:
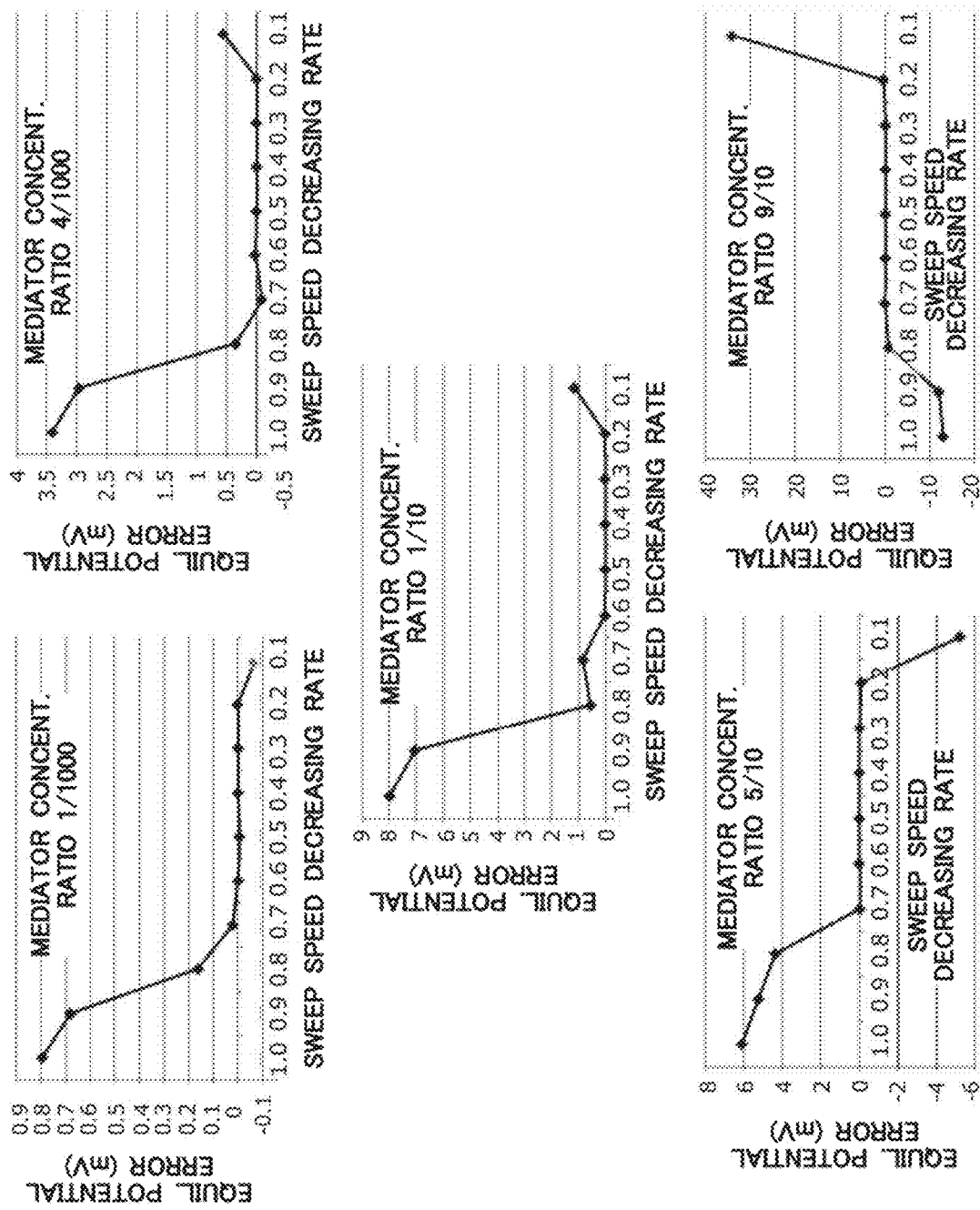
FIG. 12 shows relationships between sweep speed decreasing rates and equilibrium potential errors (mV).

FIG. 12 shows relationships between sweep speed decreasing rates and equilibrium potential errors (mV). In the present example, the sweep speed decreasing rate is changed from 0.1 to 1.0. The mediator concentration ratios are 1/1000, 4/1000, 1/10, 5/10 and 9/10, respectively. The equilibrium potential error indicates a difference from the equilibrium potential estimated and a theoretical equilibrium potential using each sweep speed decreasing rate.

For example, in the case of the mediator concentration ratio of 1/1000, if the sweep speed decreasing rate is 0.1 to 0.7, the equilibrium potential error converges to 0.1 mV or smaller. On the other hand, if the sweep speed decreasing rate is 0.8 to 1.0, the equilibrium potential error becomes 0.1 my or larger, the equilibrium potential converges at a position where it is still influenced by the concentration gradient. In the present example, if the sweep speed decreasing rate is 0.1 to 0.7, it can be decided that the equilibrium potential error is sufficiently small. Also, in the case of the other mediator concentration ratios, if the sweep speed decreasing rate is 0.2 to 0.7, the equilibrium potential error is near 0 mV. However, if the sweep speed decreasing rate is 0.1 and 0.2, in some cases, it may not converge within measurement time because sweeping is too slow. For example, under a condition that measurement time is one minute, and it is discontinued after that, the sweep speed decreasing rate is preferably 0.4 or larger.

FIG. 13 to FIG. 17 show simulation results of concentration gradients of reduction substance concentrations. The simulations in the present example gave results obtained by changing the mediator concentration ratios in five patterns. Each simulation result shows a relationship between the mediator concentration ratio and the concentration gradient after a voltage has converged.

Figure 13:
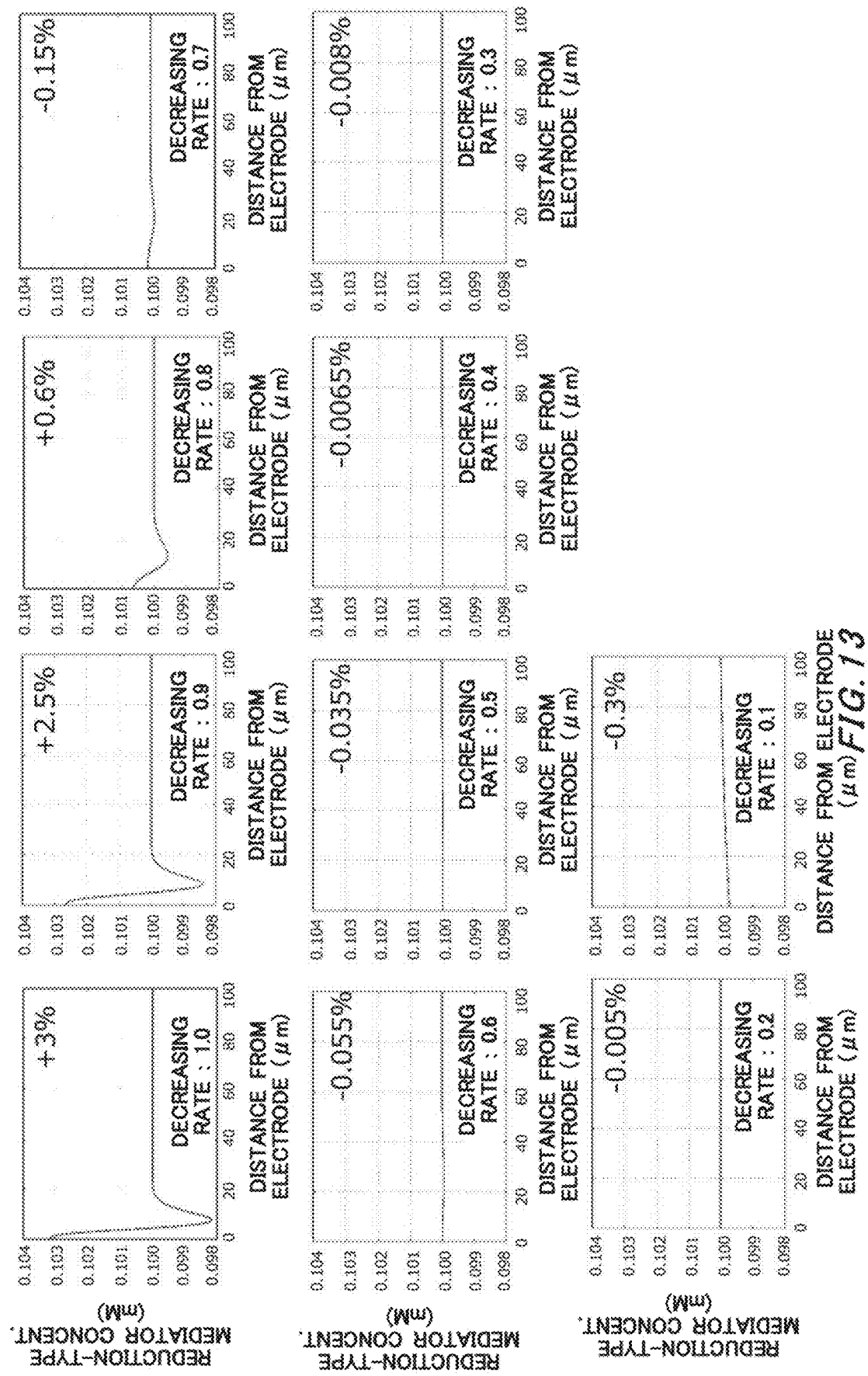
FIG. 13 shows relationships between sweep speed decreasing rates and a reduction-type mediator concentration gradient.

FIG. 13 shows relationships between sweep speed decreasing rates and reduction-type mediator concentration gradients. The mediator concentration ratio in the present example is 1/1000. In the graph, the sweep speed decreasing rate, and the difference between the surface concentration of a reduction-type mediator and the bulk concentration of the reduction-type mediator are shown. If the decreasing rate is changed from 1.0 to 0.1, the magnitudes of errors of the surface concentration relative to the bulk concentration of the reduction-type mediator are +3%, +2.5%, +0.6%, −0.15%, −0.055%, −0.035%, −0.0065%, −0.008%, −0.005% and −0.3%, respectively.

Figure 14:
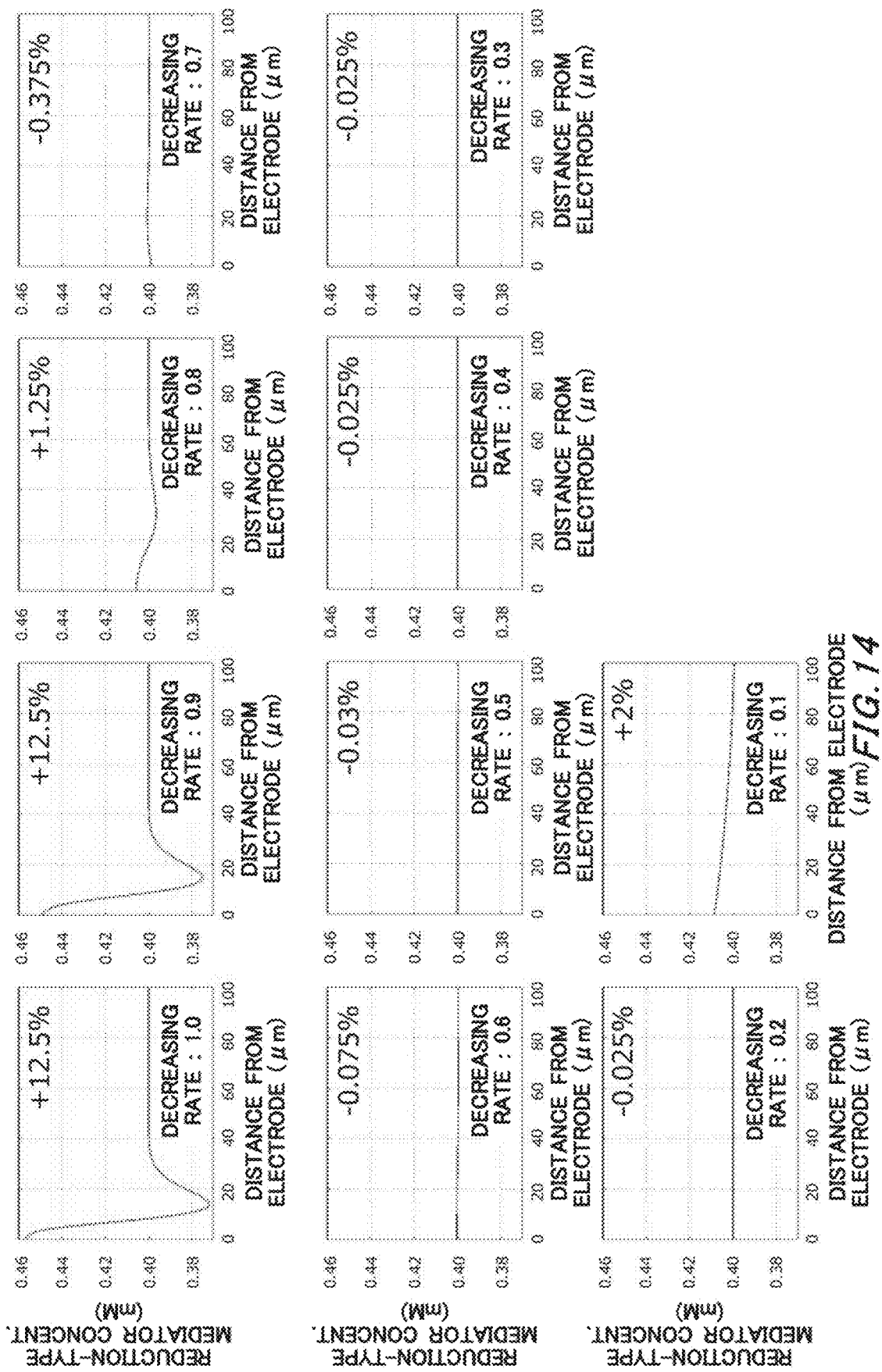
FIG. 14 shows relationships between mediator concentration ratios and concentration gradients after the termination of estimation.

FIG. 14 shows relationships between sweep speed decreasing rates and reduction-type mediator concentration gradients. The mediator concentration ratio in the present example is 4/1000. If the decreasing rate is changed from 1.0 to 0.1, the magnitudes of errors of the surface concentration relative to the bulk concentration of the reduction-type mediator are +12.5%, +12.5%, +1.25%, −0.375%, −0.075%, −0.03%, −0.025%, −0.025%, −0.025% and +2%, respectively.

Figure 15:
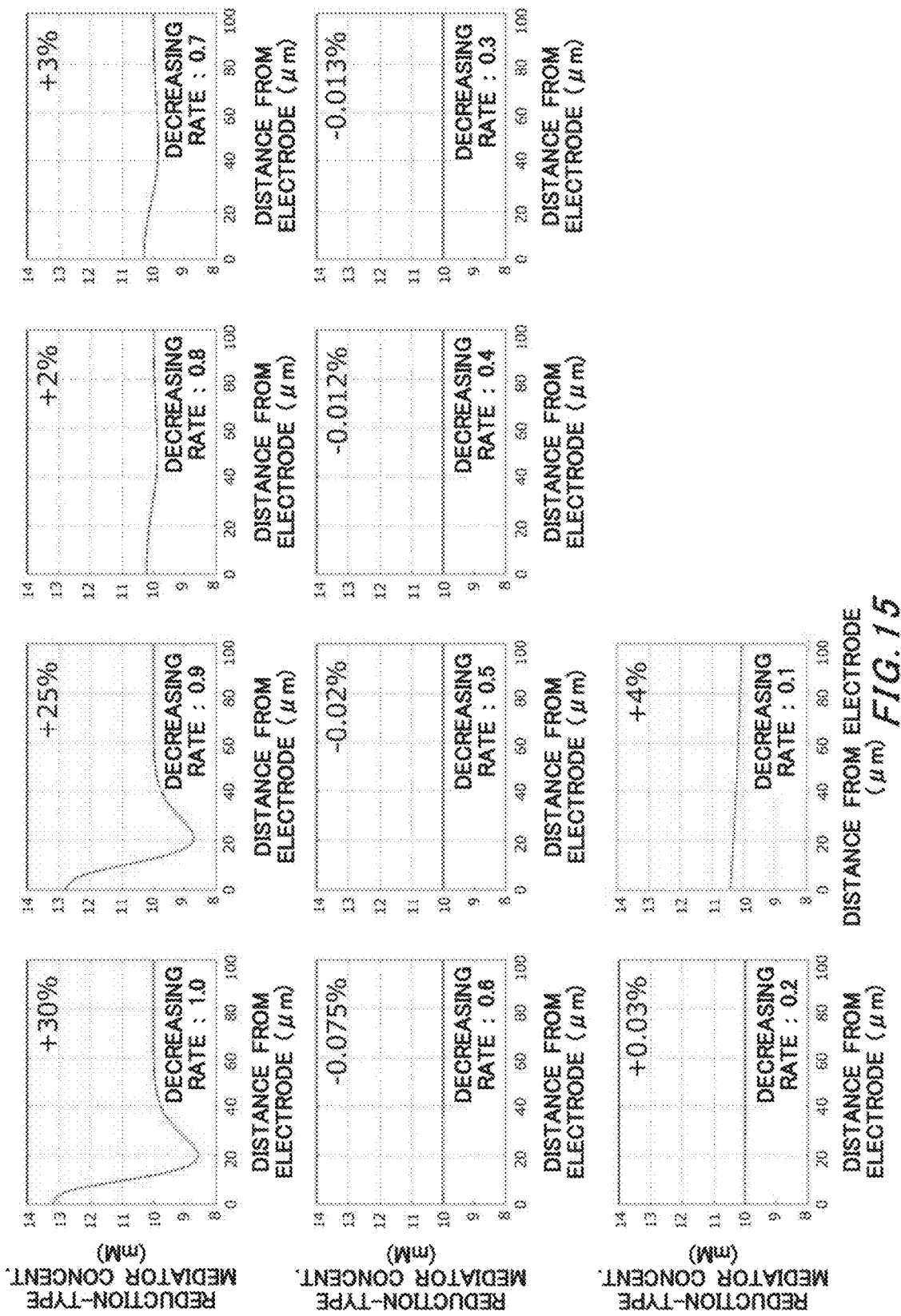
FIG. 15 shows relationships between mediator concentration ratios and concentration gradients after the termination of estimation.

FIG. 15 shows relationships between sweep speed decreasing rates and reduction-type mediator concentration gradients. The mediator concentration ratio in the present example is 1/10. If the decreasing rate is changed from 1.0 to 0.1, the magnitudes of errors of the surface concentration relative to the bulk concentration of the reduction-type mediator are ±30%, +25%, +2%, +3%, −0.075%, −0.02%, −0.012%, −0.013%, +0.03% and +4%, respectively.

Figure 16:
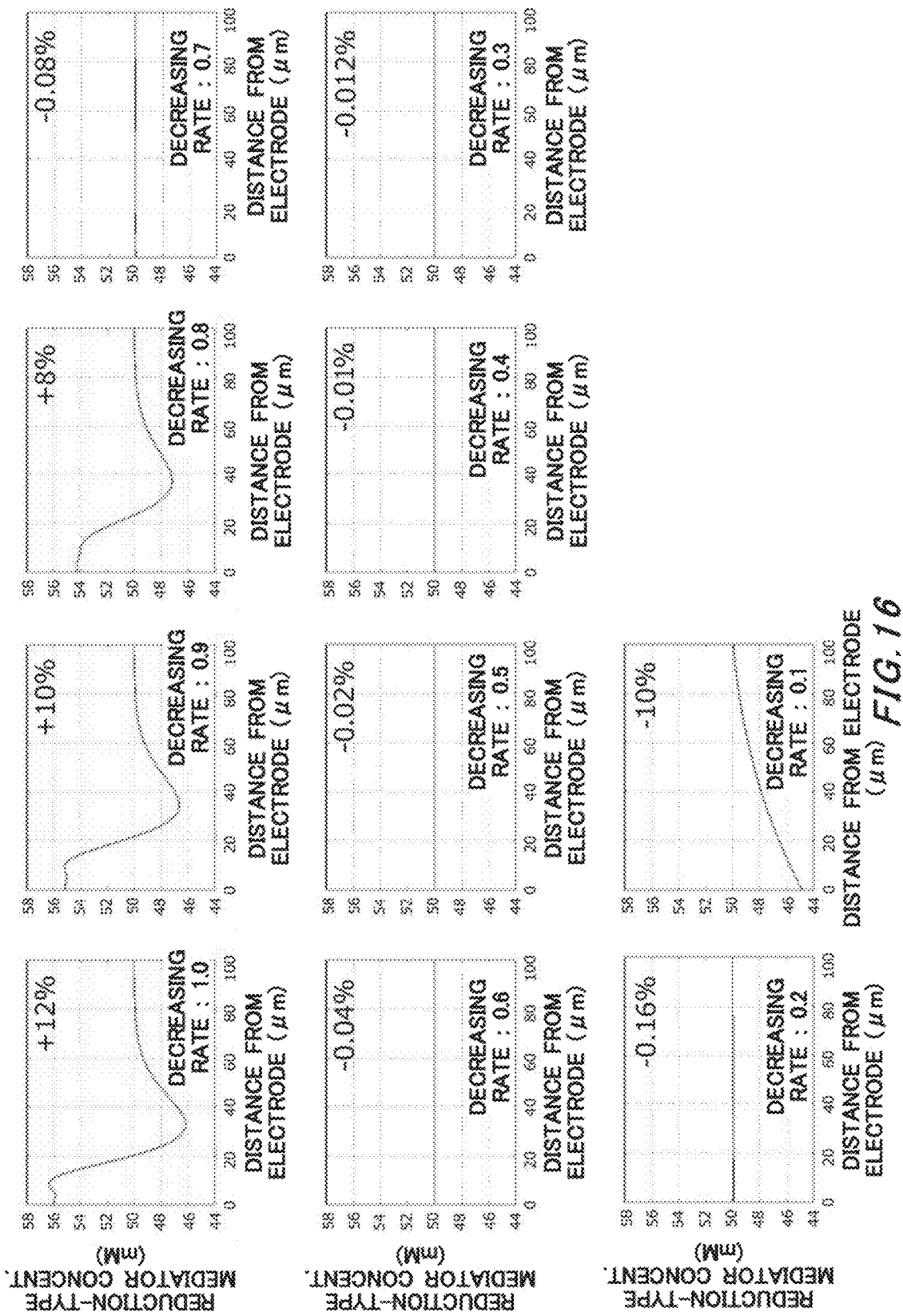
FIG. 16 shows relationships between mediator concentration ratios and concentration gradients after the termination of estimation.

FIG. 16 shows relationships between sweep speed decreasing rates and reduction-type mediator concentration gradients. The mediator concentration ratio in the present example is 5/10. If the decreasing rate is changed from 1.0 to 0.1, the magnitudes of errors of the surface concentration relative to the bulk concentration of the reduction-type mediator are +12%, +10%, +8%, −0.08%, −0.04%, −0.02%, −0.01%, −0.012%, −0.16% and −10%, respectively.

Figure 17:
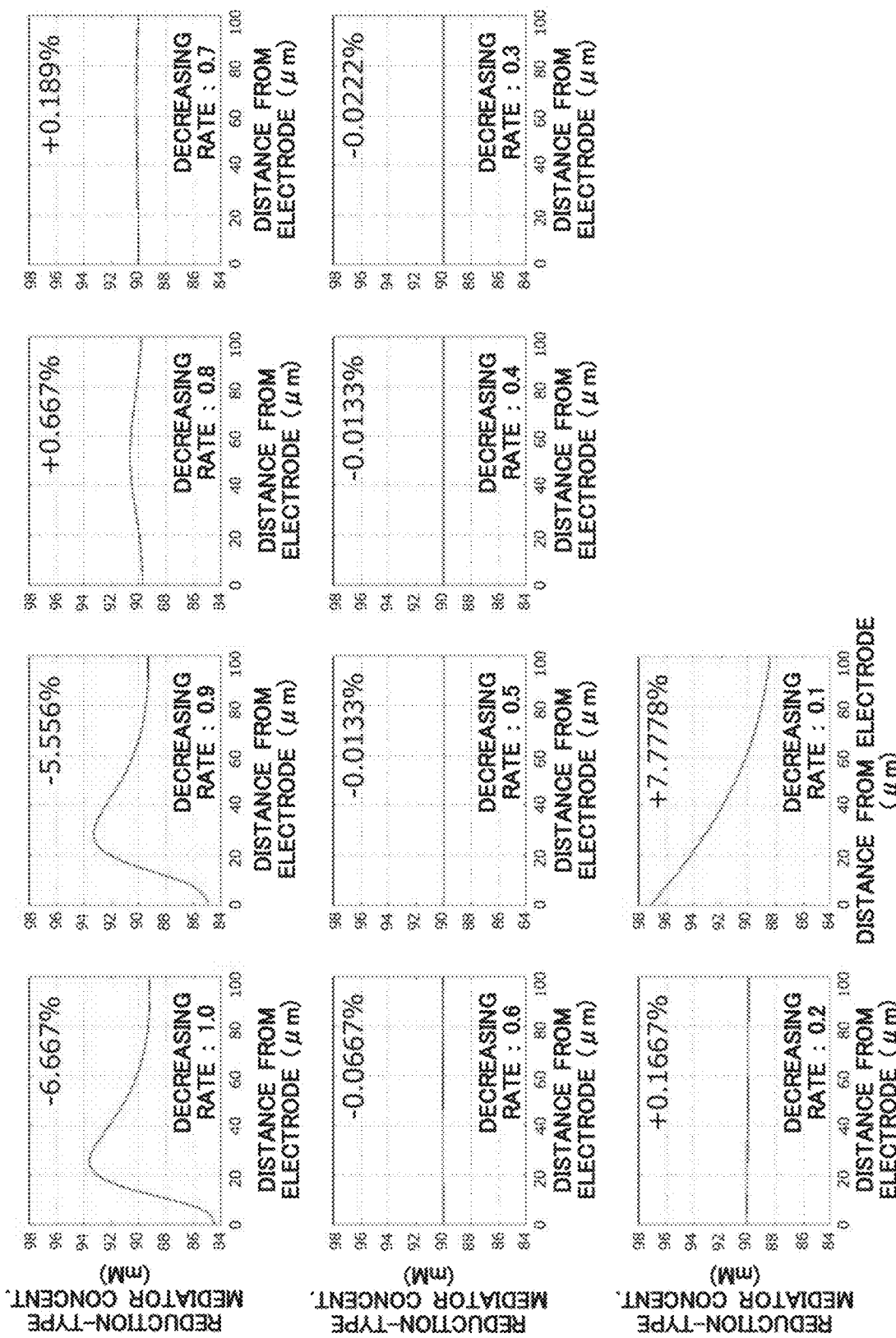
FIG. 17 shows relationships between mediator concentration ratios and concentration gradients after the termination of estimation.

FIG. 17 shows relationships between sweep speed decreasing rates and reduction-type mediator concentration gradients. The mediator concentration ratio in the present example is 9/10. If the decreasing rate is changed from 1.0 to 0.1, the magnitudes of errors of the surface concentration relative to the bulk concentration of the reduction-type mediator are −6.667%, −5.556%, +0.667%, +0.189%, −0.0667%, −0.0133%, −0.0133%, −0.0222%, +0.1667% and +7.7778%, respectively.

From the results of FIG. 12 to FIG. 17, the range of potential fall speed rates may be 0.1 to 0.8. More desirably, the range of potential fall speed rate is 0.2 to 0.7. Still more desirably, the range of potential fall speed rates is 0.4 to 0.6 times. The potential fall speed rate to be used actually may be set considering estimation time and estimation accuracy.

Even if the potential fall speed rate is one, the equilibrium potential can be estimated in principle. Even if the sweep speed is not decreased as in this case, a voltage converges, and the mediator concentration and the equilibrium potential are correlated with each other in some cases. Also, in a case where there is a correlation between the mediator concentration and the equilibrium potential, even if an estimated equilibrium potential and a true equilibrium potential do not match, the mediator concentration can be estimated by drawing a calibration curve.

Figure 18:
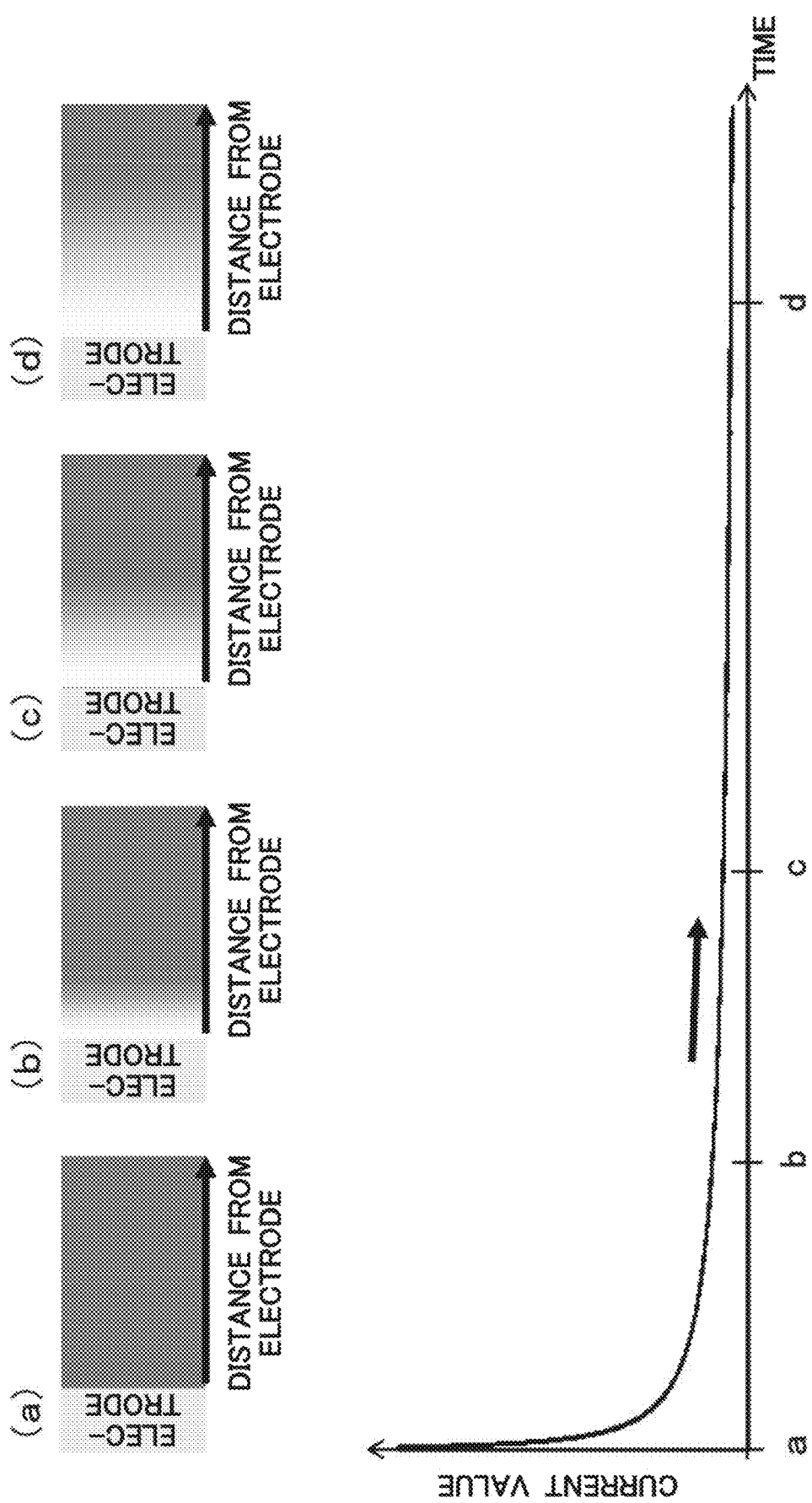
FIG. 18 is a figure for explaining a constant voltage current measuring method, which is a conventional technique.

FIG. 18 is a figure for explaining a constant voltage current measuring method, which is a conventional technique. The graph shows temporal changes in current values. (a) to (d) of FIG. 18 show the electrode 10 and concentrations of a solution relative to a distance from the electrode 10 at the time a to the time d, respectively.

(a) of FIG. 18 is a schematic diagram of a solution concentration gradient at the time a which is the time of the start of measurement. At the time a, the concentrations of a solution are uniform regardless of the distance from the electrode 10. In other words, the surface concentration and bulk concentration of a solution are equal to each other.

(b) of FIG. 18 is a schematic diagram of a solution concentration gradient at the time b. At the time b, the concentration becomes gradually lower from the proximity of the electrode 10. In other words, the surface concentration of the solution lowers.

(c) of FIG. 18 is a schematic diagram of a solution concentration gradient at the time c. At the time c, the concentration becomes further lower from the proximity of the electrode 10. At the time c, the distances, from the electrode 10, to portions at which the concentration of the solution is low are longer than those at the time b. The distance to a portion at which the concentration of the solution is low is determined depending on the diffusion coefficient of the solution.

(d) of FIG. 18 is a schematic diagram of a solution concentration gradient at the time d. The time d, diffusion of a measurement substance is limited. At the time d, the distances, from the electrode 10, to portions at which the concentration of the solution is low are further longer than those at the time c.

In constant voltage current measuring methods, a concentration is estimated from changes in currents flowing through the electrode 10. For example, changes in currents are a slope of the currents. Here, the theoretical formula of constant voltage current measurement is:

$$i = nFAC\left(\sqrt{\frac{D}{\pi t}}\right) \quad \text{[Equation 2]}$$

where n and F are constants, A is an electrode area, C is a solution concentration, D is a diffusion coefficient and t is time.

The equilibrium potential estimating method is advantageous in various aspects over constant voltage current measuring methods. First, in the equilibrium potential estimating method, the influence of an electrode area is smaller than that in constant voltage current measuring methods. Because in constant voltage current measuring methods, current is proportional to the electrode area A, high machining accuracy is required for an electrode. For example, in order to improve the measurement accuracy of constant voltage current measuring methods, the machining accuracy for an electrode is increased using an expensive material such as gold. On the other hand, in the equilibrium potential estimating method, control is performed such that the current integrated value becomes 0 so that the electrode area A have no influence. That is, because the machining accuracy for the electrode 10 is not required, a material with rough surfaces such as carbon can be used. The material costs of carbon are low as compared with a material such as gold, so the manufacturing cost can be reduced.

Second, in the equilibrium potential estimating method, the influence of a diffusion coefficient is smaller than that in constant voltage current measuring methods. In constant voltage current measuring methods, current changes corresponding to the diffusion coefficient of a solution. Also, if a blood sugar level is estimated, because there are individual differences in the diffusion coefficients of blood, the estimation results may be different from each other even if blood sugar levels are the same. On the other hand, in the equilibrium potential estimating method, control is performed such that the current integrated value becomes 0 so that a diffusion coefficient does not have influence. In other words, if the equilibrium potential estimating method is used, a blood sugar level can be estimated precisely irrespective of differences in diffusion coefficients attributable to individual differences of blood.

Third, in the equilibrium potential estimating method, the influence of an interference substance is smaller than that in constant voltage current measuring methods. An interference substance is a substance that undergoes an oxidation-reduction reaction on a surface of the electrode 10 due to a voltage being applied to the electrode 10. In constant voltage current measuring methods, oxidation of entire reduction-type mediators present on a surface of the electrode 10 requires a high voltage to be applied to the electrode 10. Thereby, many interference substances are oxidized on a surface of the electrode 10, a current due to the interference substances being oxidized flows in addition to a current due to oxidation of reduction-type mediators, and this increases a measured current value; therefore, the concentration of a solution cannot be estimated precisely. On the other hand, in the equilibrium potential estimating method, a voltage applied is lower than those in constant voltage current measuring methods, and currents that are attributable to an interference substance being oxidized are less. For this reason, in the equilibrium potential estimating method, the influence of an interference substance is smaller than that in constant voltage current measuring methods, and more highly accurate estimation becomes possible.

Constant voltage current measuring methods measure a reaction of either oxidation or reduce continuously. On the other hand, because the equilibrium potential estimating method is non-destructive measurement that repeats both the reactions of oxidation and reduce, so it can measure a single solution repeatedly. That is, a solution on which measurement is performed by the equilibrium potential estimating method can undergo measurement again after an elapse of certain time, so temporal changes of the solution can be detected. As described above, the equilibrium potential estimating method is advantageous in that it improves a signal-noise (S/N) ratio, and can handle a wider range of measurement targets.

Figure 19:
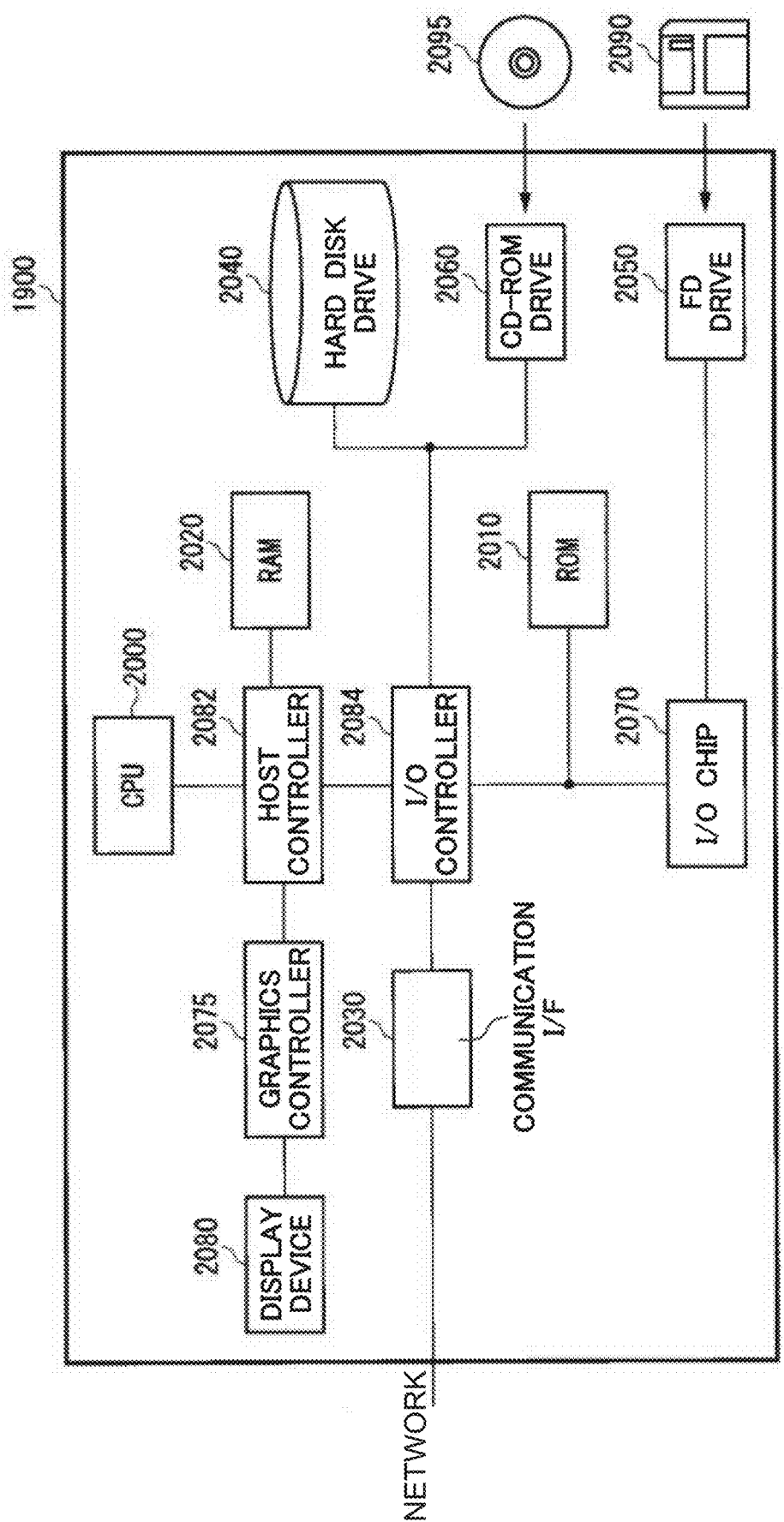
FIG. 19 shows an exemplary hardware configuration of a computer 1900 according to an embodiment of the present invention.

FIG. 19 shows an exemplary hardware configuration of a computer 1900 according to the present embodiment. The computer 1900 according to the present embodiment includes: a CPU peripheral unit having a CPU 2000, a RAM 2020, a graphics controller 2075 and a display device 2080 that are interconnected by a host controller 2082; an input/output unit having a communication interface 2030, a hard disk drive 2040 and a CD-ROM drive 2060 connected to the host controller 2082 by an input/output controller 2084; and a legacy input/output unit having a ROM 2010, a flexible disk drive 2050 and an input/output chip 2070 connected to the input/output controller 2084.

The host controller 2082 connects the RAM 2020, and the CPU 2000 and graphics controller 2075 that access the RAM 2020 at high transfer rates. The CPU 2000 operates based on a program stored on the ROM 2010 and the RAM 2020, and controls each unit. The graphics controller 2075 acquires image data to be generated on a frame buffer provided within the RAM 2020 by the CPU 2000 or the like, and displays the image data on the display device 2080. Instead of this, the graphics controller 2075 may include therein a frame buffer that stores image data generated by the CPU 2000 or the like.

The input/output controller 2084 connects the host controller 2082, and the communication interface 2030, hard disk drive 2040 and CD-ROM drive 2060 that are relatively high speed input/output devices. The communication interface 2030 communicates with other devices through a network. The hard disk drive 2040 stores therein a program and data to be used by the CPU 2000 within the computer 1900. The CD-ROM drive 2060 reads out a program or data from the CD-ROM 2095, and provides them to the hard disk drive 2040 via the RAM 2020.

Also, the ROM 2010, and relatively low speed input/output devices of the flexible disk drive 2050 and input/output chip 2070 are connected to the input/output controller 2084. The ROM 2010 stores therein a boot-program that the computer 1900 executes at the time of start-up and/or a program that is dependent on hardware of the computer 1900, or the like. The flexible disk drive 2050 reads out a program or data from the flexible disk 2090, and provides them to the hard disk drive 2040 via the RAM 2020. The input/output chip 2070 connects the flexible disk drive 2050 to the input/output controller 2084, and also connects various types of input/output devices to the input/output controller 2084 via, for example, a parallel port, a serial port, a keyboard port, a mouse port or the like.

A program to be provided to the hard disk drive 2040 via the RAM 2020 is provided by a user by being stored on a recording medium such as the flexible disk 2090, the CD-ROM 2095, an IC card or the like. The program is read out from the recording medium, installed on the hard disk drive 2040 in the computer 1900 via the RAM 2020, and executed in the CPU 2000.

The program that is installed on the computer 1900 and causes the computer 1900 to function as the signal processing unit 40 includes a signal processing module. These program and module act on the CPU 2000 or the like to cause the computer 1900 to function as a signal processing unit.

Information processing described in the program is read by the computer 1900 to function as the signal processing unit 40 which is a specific means that is realized by cooperation between software and the various types of hardware resources described above. By realizing, with these specific means, operation or processing on information corresponding to purposes of usage of the computer 1900 in the present embodiment, the specific signal processing unit 40 corresponding to the purposes of usage is constructed.

The program that is installed on the computer 1900 and causes the computer 1900 to function as the concentration estimating device 200 includes a voltage applying module, a current measuring module, a signal processing module, an equilibrium potential estimating module and a concentration estimating module. These program or modules act on the CPU 2000 or the like to cause the computer 1900 to function as a concentration estimating device, respectively.

Information processing described in the program is read by the computer 1900 to function as the voltage applying unit 20, the current measuring unit 30, the signal processing unit 40, the equilibrium potential estimating unit 50 and the concentration estimating unit 60 which are specific means that are realized by cooperation between software and the various types of hardware resources described above. By realizing, with these specific means, operation or processing on information corresponding to purposes of usage of the computer 1900 in the present embodiment, the specific concentration estimating device 200 corresponding to the purposes of usage is constructed.

In one example, if communication is performed between the computer 1900 and an external device or the like, the CPU 2000 executes a communication program loaded onto the RAM 2020, and based on the processing contents described in the communication program, instructs the communication interface 2030 to perform communication processing. Under control of the CPU 2000, the communication interface 2030 reads out transmission data memorized in a transmission buffer region or the like provided on a storage such as the RAM 2020, the hard disk drive 2040, the flexible disk 2090 or the CD-ROM 2095 to transmit the data to a network, or writes reception data received from a network into a reception buffer region or the like provided on a storage. In this manner, the communication interface 2030 may transfer transmission/reception data between storages by the DMA (direct memory access) scheme, or instead of this, the CPU 2000 may transfer transmission/reception data by reading out data from a transfer source storage or communication interface 2030, and writing the data into a transfer destination communication interface 2030 or storage.

Also, the CPU 2000 causes all or necessary portions of files, databases or the like stored in an external storage such as the hard disk drive 2040, the CD-ROM drive 2060 (CD-ROM 2095) or the flexible disk drive 2050 (flexible disk 2090) to be read into the RAM 2020 by the DMA transfer or other schemes, and performs various types of processing on the data on the RAM 2020. The CPU 2000 writes the data on which processing has been performed back into an external storage by the DMA transfer or other schemes. Because in such processing, the RAM 2020 can be regarded as holding contents of the external storage temporarily, the RAM 2020 and the external storage or the like are collectively called a memory, a memory unit, a storage or the like in the present embodiment. Various types of information such as various types of programs, data, tables, databases or the like in the present embodiment are stored in such a storage, and are subjected to information processing. The CPU 2000 can also hold a portion of the RAM 2020 on a cache memory, and read out from and write in the cache memory. Because in such an embodiment also, the cache memory plays a role of some of the functions of the RAM 2020, in the present embodiment, the cache memory is also regarded as being included in the RAM 2020, a memory and/or a storage unless otherwise they are distinguished from each other.

Also, the CPU 2000 performs, on data read out from the RAM 2020, various types of processing including various types of operation, information processing, conditional decision, information search/replacement or the like described in the present embodiment that are specified in an instruction sequence of a program, and writes the data back into the RAM 2020. For example, when performing conditional decision, the CPU 2000 compares various types of variables shown in the present embodiment to decide whether they meet conditions such as being larger than, smaller than, equal to or larger than, equal to or smaller than other variables or constants, and if a condition is met (or if it is not met) branches to a different instruction sequence or calls up a subroutine.

Also, the CPU 2000 can search information stored in files, databases or the like in a storage. For example, if a plurality of entries in which attribute values of a second attribute are respectively associated with attribute values of a first attribute are stored in a storage, the CPU 2000 searches, from among the plurality of entries stored in the storage, an entry whose attribute value of the first attribute matches a specified condition, and reads out the attribute value of the second attribute stored in the entry, thereby being able to obtain the attribute value of the second attribute associated with the first attribute that meets a predetermined condition.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

The programs or modules shown above may be stored on an external recording medium. The recording medium to be used may be, other than the flexible disk 2090 and the CD-ROM 2095, an optical recording medium such as DVD or CD, a magneto-optical recording medium such as MO, a tape medium, a semiconductor memory such as IC card or the like. Also, a storage such as a hard disk or a RAM provided to a server system connected to a dedicated communication network or the Internet may be used as a recording medium, and a program may be provided to the computer 1900 through the network.

Hereinafter, implementation aspects of the present invention are shown.

[Implementation Aspect 1]

An oxidation-reduction substance equilibrium potential estimating method, comprising:

applying a voltage to an electrode and sweeping the voltage;

measuring a current flowing through the electrode;

if an integrated value of the current becomes a predetermined value, judging whether or not a sweep width of the voltage is within a tolerated range;

if it is judged that the sweep width is within the tolerated range, estimating an oxidation-reduction substance equilibrium potential at a voltage value within the tolerated range; and if it is judged that the sweep width is outside the tolerated range, sweeping the voltage in an opposite direction to a sweep direction in previous sweeping.

[Implementation Aspect 2]

The oxidation-reduction substance equilibrium potential estimating method according to Implementation Aspect 1, wherein the judging and the sweeping the voltage in an opposite direction are repeatedly executed until it is judged that the sweep width of the voltage is within the tolerated range.

[Implementation Aspect 3]

The oxidation-reduction substance equilibrium potential estimating method according to Implementation Aspect 1 or 2, wherein a sweep speed for the voltage is adjusted such that time during which the voltage is being swept becomes constant since the integrated value of the current becomes a predetermined value until the integrated value of the current next becomes a predetermined value.

[Implementation Aspect 4]

The oxidation-reduction substance equilibrium potential estimating method according to any one of Implementation Aspects 1 to 3, wherein the sweeping the voltage in an opposite direction has sweeping the voltage at a sweep speed lower than a sweep speed in previous sweeping.

[Implementation Aspect 5]

The oxidation-reduction substance equilibrium potential estimating method according to Implementation Aspect 4, wherein the sweep speed at the sweeping the voltage in an opposite direction is 0.1 to 0.8 times a sweep speed in previous sweeping.

[Implementation Aspect 6]

The oxidation-reduction substance equilibrium potential estimating method according to implementation Aspect 5, wherein the sweep speed at the sweeping the voltage in an opposite direction is 0.2 to 0.7 times a sweep speed in previous sweeping.

[Implementation Aspect 7]

The oxidation-reduction substance equilibrium potential estimating method according to Implementation Aspect 6, wherein the sweep speed at the sweeping the voltage in an opposite direction is 0.4 to 0.6 times a sweep speed in previous sweeping.

[Implementation Aspect 8]

The oxidation-reduction substance equilibrium potential estimating method according to any one of Implementation Aspects 1 to 7, wherein the judging has judging whether or not the sweep width of the voltage is within the tolerated range if a symbol of the integrated value is reversed.

[Implementation Aspect 9]

An oxidation-reduction substance concentration estimating method comprising:

the applying and sweeping to the sweeping the voltage in an opposite direction in the oxidation-reduction substance equilibrium potential estimating method according to any one of Implementation Aspects 1 to 8; and estimating a concentration of the oxidation-reduction substance based on the voltage value.

[Implementation Aspect 10]

An oxidation-reduction substance equilibrium potential estimating device comprising:

a voltage applying unit that applies a voltage to an electrode;

a current measuring unit that measures a current flowing through the electrode; and a signal processing unit that instructs the voltage applying unit to sweep the voltage and judges whether or not a sweep width of the voltage is within a tolerated range if an integrated value of the current becomes a predetermined value, wherein the signal processing unit instructs the voltage applying unit to: estimate an oxidation-reduction substance equilibrium potential at a voltage value within the tolerated range if the sweep width is within the tolerated range; and sweeps the voltage in an opposite direction to a previous sweep direction if the sweep width is not within the tolerated range.

[Implementation Aspect 11]

The oxidation-reduction substance equilibrium potential estimating device according to Implementation Aspect 10, wherein the signal processing unit repeats instructing the voltage applying unit to sweep the voltage in an opposite direction to a previous sweep direction until the sweep width of the voltage becomes a width within the tolerated range.

[Implementation Aspect 12]

The oxidation-reduction substance equilibrium potential estimating device according to Implementation Aspect 11, wherein the signal processing unit adjusts a sweep speed for the voltage such that time during which the voltage is being swept becomes constant since the integrated value of the current becomes a predetermined value until the integrated value of the current next becomes a predetermined value.

[Implementation Aspect 13]

The oxidation-reduction substance equilibrium potential estimating device according to any one of Implementation Aspects 10 to 12, wherein the signal processing unit instructs the voltage applying unit to sweep the voltage at a sweep speed lower than a previous sweep speed if the sweep width of the voltage is not within the tolerated range.

[Implementation Aspect 14]

The oxidation-reduction substance equilibrium potential estimating device according to Implementation Aspect 13, wherein the signal processing unit instructs the voltage applying unit to sweep the voltage at a rate which is 0.1 to 0.8 times a previous sweep speed if the sweep width of the voltage is not within the tolerated range.

[Implementation Aspect 15]

The oxidation-reduction substance equilibrium potential estimating device according to Implementation Aspect 14, wherein the signal processing unit instructs the voltage applying unit to sweep the voltage at a rate which is 0.2 to 0.7 times a previous sweep speed if the sweep width of the voltage is not within the tolerated range.

[Implementation Aspect 16]

The oxidation-reduction substance equilibrium potential estimating device according to Implementation Aspect 15, wherein the signal processing unit instructs the voltage applying unit to sweep the voltage at a rate which is 0.4 to 0.6 times a previous sweep speed if the sweep width of the voltage is not within the tolerated range.

[Implementation Aspect 17]

The oxidation-reduction substance equilibrium potential estimating device according to any one of Implementation Aspects 10 to 16, wherein the signal processing unit judges whether or not the sweep width of the voltage is within a tolerated range if a symbol of the integrated value is reversed.

[Implementation Aspect 18]

An oxidation-reduction substance concentration estimating device comprising:

the oxidation-reduction substance equilibrium potential estimating device according to any one of Implementation Aspects 10 to 17; and an estimating unit that estimates a concentration of the oxidation-reduction substance based on the voltage value.

[Implementation Aspect 19]

A program that causes a computer to function as the signal processing unit in the oxidation-reduction substance equilibrium potential estimating device according to any one of Implementation Aspects 10 to 17.

[Implementation Aspect 20]

A program that causes a computer to function as the signal processing unit and the estimating unit in the oxidation-reduction substance concentration estimating device according to Implementation Aspect 18.

[Implementation Aspect 21]

A computer-readable medium comprising the program according to the Implementation Aspect 19 or 20.

[Implementation Aspect 22]

A blood sugar estimating device comprising:

the oxidation-reduction substance concentration estimating device according to Implementation Aspect 18; and the electrode.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE SYMBOLS

10: electrode; 20: voltage applying unit; 30: current measuring unit; 40: signal processing unit; 50: equilibrium potential estimating unit; 60: concentration estimating unit; 100: equilibrium potential estimating device; 200: concentration estimating device; 300: blood sugar estimating device; 1900: computer; 2000: CPU; 2010: ROM; 2020: RAM; 2030: communication interface; 2040: hard disk drive; 2050: flexible disk drive; 2060: CD-ROM drive; 2070: input/output chip; 2075: graphics controller; 2080: display device; 2082: host controller; 2084: input/output controller; 2090: flexible disk; 2095: CD-ROM

What is claimed is:

1. An oxidation-reduction substance equilibrium potential estimating method, comprising:
   applying a voltage to an electrode contacting a sample containing an oxidation-reduction substance;
   alternately sweeping the applied voltage in a first direction, and in a second direction opposite the first direction, until the applied voltage converges;
   measuring a current flowing through the electrode;
   determining whether the applied voltage has converged when the integrated value of the current becomes zero or negative during sweeping of the applied voltage in a direction to be reduced, or when the integrated value becomes zero or positive during sweeping of the applied voltage in a direction to be increased; and estimating an oxidation-reduction substance equilibrium potential at a value of the converged applied voltage.

2. The oxidation-reduction substance equilibrium potential estimating method according to claim 1, wherein the determining further determines whether or not at least one of: a sweep width of the applied voltage is within a predetermined sweep width range, a change amount between currents corresponding to the sweep width is within a predetermined current range, or a change amount between integrated values corresponding to the sweep width is within a predetermined integrated value range, and when at least one of the sweep width of the applied voltage, the change amount between the currents corresponding to the sweep width, or the change amount between the integrated values corresponding to the sweep width, is within the respective predetermined sweep width range, predetermined current range, or predetermined integrated value range, then the applied voltage is determined to have converged.

3. The oxidation-reduction substance equilibrium potential estimating method according to claim 2, wherein the sweeping of the applied voltage is terminated when a sign of the integrated value is reversed.

4. The oxidation-reduction substance equilibrium potential estimating method according to claim 1, further comprising:

terminating the sweeping the applied voltage when the applied voltage has not converged after a number of times of the sweeping is N (N being a natural number).

5. The oxidation-reduction substance equilibrium potential estimating method according to claim 1, wherein a sweep speed for the sweeping the applied voltage is adjusted such that time during which the applied voltage is being swept becomes constant since the sweep direction is changed until the sweep direction is changed next time.

6. The oxidation-reduction substance equilibrium potential estimating method according to claim 1, wherein the sweeping the voltage in an opposite direction has sweeping the voltage at a sweep speed lower than a sweep speed in the previous sweeping.

7. The oxidation-reduction substance equilibrium potential estimating method according to claim 6, wherein the sweep speed at the sweeping the voltage in an opposite direction is 0.1 to 0.8 times a sweep speed in the previous sweeping.

8. The oxidation-reduction substance equilibrium potential estimating method according to claim 7, wherein the sweep speed at the sweeping the voltage in an opposite direction is 0.2 to 0.7 times a sweep speed in the previous sweeping.

9. The oxidation-reduction substance equilibrium potential estimating method according to claim 8, wherein the sweep speed at the sweeping the voltage in an opposite direction is 0.4 to 0.6 times a sweep speed in the previous sweeping.

10. An oxidation-reduction substance concentration estimating method comprising:

applying a voltage to an electrode contacting a sample containing an oxidation-reduction substance;

alternately sweeping the applied voltage in a first direction, and in a second direction opposite the first direction, until the applied voltage converges;

measuring a current flowing through the electrode;

determining whether the applied voltage has converged when the if an integrated value of the current becomes zero or negative during sweeping of the applied voltage in a direction to be reduced, or when the integrated value becomes zero or positive during sweeping of the applied voltage in a direction to be increased; and estimating a concentration of the oxidation-reduction substance based on value a value of the converged applied voltage.

11. An oxidation-reduction substance equilibrium potential estimating device comprising:

a voltage applying unit configured to apply a voltage to an electrode contacting a sample containing an oxidation-reduction substance;

alternately sweeping the applied voltage in a first direction, and in a second direction opposite the first direction, until the applied voltage converges;

a current measuring unit configured to measure a current flowing through the electrode; and a signal processing unit configured to determine when an integrated value of the current becomes zero or negative during sweeping of the applied voltage in a direction to be reduced, or when the integrated value becomes zero or positive during sweeping of the applied voltage in a direction to be increased, wherein the signal processing unit is further configured to estimate an oxidation-reduction substance equilibrium potential at a value of the converged applied voltage.

12. The oxidation-reduction substance equilibrium potential estimating device according to claim 11, wherein the signal processing unit is further configured to:

judge whether or not at least one of: a sweep width of the applied voltage is within a predetermined sweep width range, a change amount between currents corresponding to the sweep width is within a predetermined current range, or a change amount between integrated values corresponding to the sweep width is within a predetermined integrated value range; and determine that the applied voltage has converged when at least one of: the sweep width of the applied voltage, the change amount between the currents corresponding to the sweep width, or the change amount between the integrated values corresponding to the sweep width is within the predetermined integrated value range.

13. The oxidation-reduction substance equilibrium potential estimating device according to claim 12, wherein the signal processing unit is further configured to adjust a sweep speed for the applied voltage such that time during which the applied voltage is being swept becomes constant since the sweep direction is changed until the sweep direction is changed next time.

14. The oxidation-reduction substance equilibrium potential estimating device according to claim 12, wherein the signal processing unit is further configured to instruct the voltage applying unit to sweep the applied voltage at a sweep speed lower than a previous sweep speed when the sweep width of the applied voltage is not within the predetermined sweep width range.

15. The oxidation-reduction substance equilibrium potential estimating device according to claim 14, wherein the signal processing unit is further configured to instruct the voltage applying unit to sweep the applied voltage at a rate which is 0.1 to 0.8 times a previous sweep speed when the sweep width of the applied voltage is not within the predetermined sweep width range.

16. The oxidation-reduction substance equilibrium potential estimating device according to claim 15, wherein the signal processing unit is further configured to instruct the voltage applying unit to sweep the applied voltage at a rate which is 0.2 to 0.7 times the previous sweep speed when the sweep width of the applied voltage is not within the predetermined sweep width range.

17. The oxidation-reduction substance equilibrium potential estimating device according to claim 16, wherein the signal processing unit is further configured to instruct the voltage applying unit to sweep the voltage at a rate which is 0.4 to 0.6 times the previous sweep speed when the sweep width of the applied voltage is not within the predetermined sweep width range.

18. The oxidation-reduction substance equilibrium potential estimating device according to claim 11, wherein the signal processing unit is further configured to:
instruct the voltage applying unit to repeatedly alternately sweep the applied voltage in an opposite direction to a sweep direction in a previous sweeping when a number of times of the sweeping is less than N (wherein N is a natural number); and
determine that the applied voltage has converged when the number of times of the sweeping is N.

19. The oxidation-reduction substance equilibrium potential estimating device according to claim 11, wherein the signal processing unit is further configured to determine whether to terminate the sweeping of the applied voltage when a sign of the integrated value is reversed.

20. An oxidation-reduction substance concentration estimating device comprising:
the oxidation-reduction substance equilibrium potential estimating device according to claim 11; and
an estimating unit that estimates a concentration of the oxidation-reduction substance based on a value of the applied voltage.

21. A blood sugar estimating device comprising:
the oxidation-reduction substance concentration estimating device according to claim 20; and
the electrode.

* * * * *